United States Patent
Kuroda

(10) Patent No.: US 8,981,687 B2
(45) Date of Patent: Mar. 17, 2015

(54) MOTOR CONTROL APPARATUS AND ELECTRIC POWER STEERING APPARATUS USING THE SAME

(71) Applicant: Denso Corporation, Kariya, Aichi-pref. (JP)

(72) Inventor: Yoshihide Kuroda, Obu (JP)

(73) Assignee: Denso Corporation, Kariya (JP)

( * ) Notice: Subject to any disclaimer, the term of this patent is extended or adjusted under 35 U.S.C. 154(b) by 31 days.

(21) Appl. No.: 13/888,714

(22) Filed: May 7, 2013

(65) Prior Publication Data
US 2013/0334995 A1    Dec. 19, 2013

(30) Foreign Application Priority Data

Jun. 15, 2012   (JP) ................................. 2012-136200

(51) Int. Cl.
| H02P 21/00 | (2006.01) |
| H02P 21/13 | (2006.01) |
| H02P 27/06 | (2006.01) |
| H02P 25/22 | (2006.01) |
| H02P 27/08 | (2006.01) |

(Continued)

(52) U.S. Cl.
CPC ................. *H02P 27/06* (2013.01); *H02P 21/13* (2013.01); *H02P 21/00* (2013.01); *H02P 25/22* (2013.01); *H02P 27/08* (2013.01); *H02P 29/021* (2013.01); *B62D 5/0481* (2013.01); *B62D 5/0493* (2013.01)
USPC ............. 318/400.02; 318/400.04; 318/400.08

(58) Field of Classification Search
CPC ....... H02P 27/06; H02P 27/08; H02P 27/085; H02P 27/12; H02P 23/00; H02P 21/00; H02P 21/13; G01R 31/343

USPC ........... 318/724, 490, 400.02, 400.08; 701/42
See application file for complete search history.

(56) References Cited

U.S. PATENT DOCUMENTS

| 5,481,460 A | 1/1996 | Masaki et al. |
| 2002/0091470 A1 | 7/2002 | Sasazawa et al. |
| 2008/0147949 A1 | 6/2008 | Miyake |

(Continued)

FOREIGN PATENT DOCUMENTS

| JP | 05-103497 | 4/1993 |
| JP | H8-123501 | 5/1996 |

(Continued)

OTHER PUBLICATIONS

Suzuki, U.S. Appl. No. 13/869,452, filed Apr. 24, 2013.

(Continued)

*Primary Examiner* — Bentsu Ro
*Assistant Examiner* — Joseph G McPalmer
(74) *Attorney, Agent, or Firm* — Nixon & Vanderhye PC

(57) ABSTRACT

A motor control apparatus includes an A/D converter, which is a hardware part for converting an analog signal of a sensor to a digital signal, a microcomputer, which is a software part, and a drive circuit, which is a hardware part for driving an inverter to supply electric power to a motor. The microcomputer includes calculation blocks, each of which is a calculation block for individually calculating an output from an input. The microcomputer further executes, in parallel to control calculations, software monitor processing for each calculation block to monitor whether the control calculation is executed normally. The motor control apparatus thus can detect a software abnormality without using a monitoring hardware circuit separately.

8 Claims, 30 Drawing Sheets

(51) Int. Cl.
*H02P 29/02* (2006.01)
*B62D 5/04* (2006.01)

(56) References Cited

U.S. PATENT DOCUMENTS

| | | |
|---|---|---|
| 2011/0080126 A1* | 4/2011 | Yabuguchi et al. ...... 318/400.21 |
| 2011/0087456 A1 | 4/2011 | Satou et al. |
| 2011/0204839 A1* | 8/2011 | Mukai et al. ................... 318/724 |
| 2012/0049782 A1 | 3/2012 | Suzuki |
| 2013/0158808 A1* | 6/2013 | Imamura et al. ................ 701/42 |
| 2014/0077741 A1* | 3/2014 | Kumagai et al. .............. 318/490 |

FOREIGN PATENT DOCUMENTS

| | | |
|---|---|---|
| JP | 2008-48504 | 2/2008 |
| JP | 2008-155677 | 7/2008 |
| JP | 2010-155598 | 7/2010 |

OTHER PUBLICATIONS

Suzuki, U.S. Appl. No. 13/856,583, filed Apr. 4, 2013.
Office Action (2 pages) dated May 1, 2014 issued in corresponding Japanese Application No. 2012-136200 and English translation (2 pages).

* cited by examiner

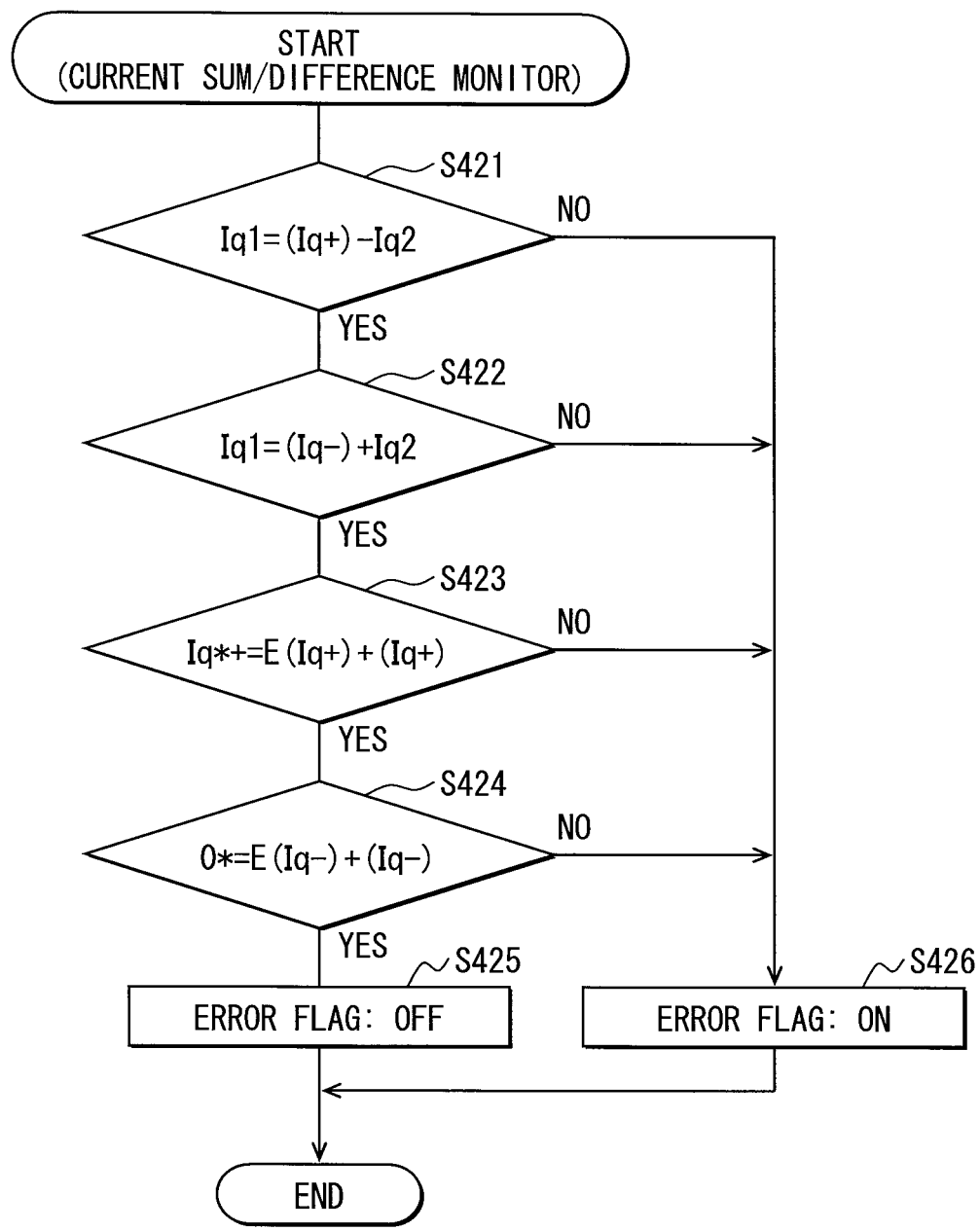

MOTOR CONTROL APPARATUS AND ELECTRIC POWER STEERING APPARATUS USING THE SAME

CROSS REFERENCE TO RELATED APPLICATION

The present application relates to and incorporates herein by reference Japanese patent application No 2012-136200 filed on Jun. 15, 2012.

FIELD

The present disclosure relates to a motor control apparatus, which controls driving of a motor, and an electric power steering apparatus, which uses the motor control apparatus.

BACKGROUND

In a conventional motor control apparatus, motor control is changed based on a fail-safe concept when an occurrence of failure is detected. The failure may be a failure in an inverter, a power relay or the like, which form a part of the motor control apparatus. The failure may also be a failure in a current sensor, a rotation angle sensor or the like, which detects each physical quantity inputted to the motor control apparatus. The motor control apparatus is caused to fail by not only a failure in a hardware part but also bugs in control software, which a microcomputer executes.

According to the apparatus disclosed in JP 4496205 (US 2008/0147949 A1), a check device in hardware configuration is provided separately from a microcomputer so that the check device executes the same calculation as that of the microcomputer or simplified calculation independently of the microcomputer. The calculation results of the microcomputer and the check device are compared to detect a software abnormality of the microcomputer.

The apparatus needs the check device (hardware device) separately from the microcomputer. The microcomputer outputs signals to the hardware device through a communication line. If the number of output signals increases depending on combinations of parameters to be monitored, a range of monitoring need be limited to avoid erroneous detections.

Further, a speed of communication by the communication line is also limited.

SUMMARY

It is therefore an object to provide a motor control apparatus, which can detect a software abnormality in a microcomputer over a wide monitoring range at an early stage.

According to one aspect, a motor control apparatus for a motor is formed of a drive circuit, an A/D converter and a microcomputer. The drive circuit drives the motor. The A/D converter converts an analog signal of a sensor, which detects an operating condition of the motor, into a digital signal. The microcomputer is programmed to calculate a control amount for driving the motor by executing a control software based on the digital signal inputted from the A/D converter and output a calculated control amount to the drive circuit. The microcomputer is further programmed to execute a software monitor processing, which monitors whether calculation of the control amount is executed normally, in parallel to the calculation of the control amount. Preferably, the microcomputer executes a control software formed of a plurality of calculation blocks, each of which calculates an output from an input thereof, and executes the software monitor processing with respect to each of the calculation blocks. Each of the calculation blocks is provided to check whether an input thereto, which is an output of a preceding one of the calculation blocks, is normal.

BRIEF DESCRIPTION OF THE DRAWINGS

The above and other objects, features and advantages will become more apparent from the following detailed description made with reference to the accompanying drawings. In the drawings:

FIG. 20 is a flowchart of software monitoring processing of the current feedback calculation block;

DETAILED DESCRIPTION OF EMBODIMENT (Embodiment)
[Entire Configuration]

Figure 1:
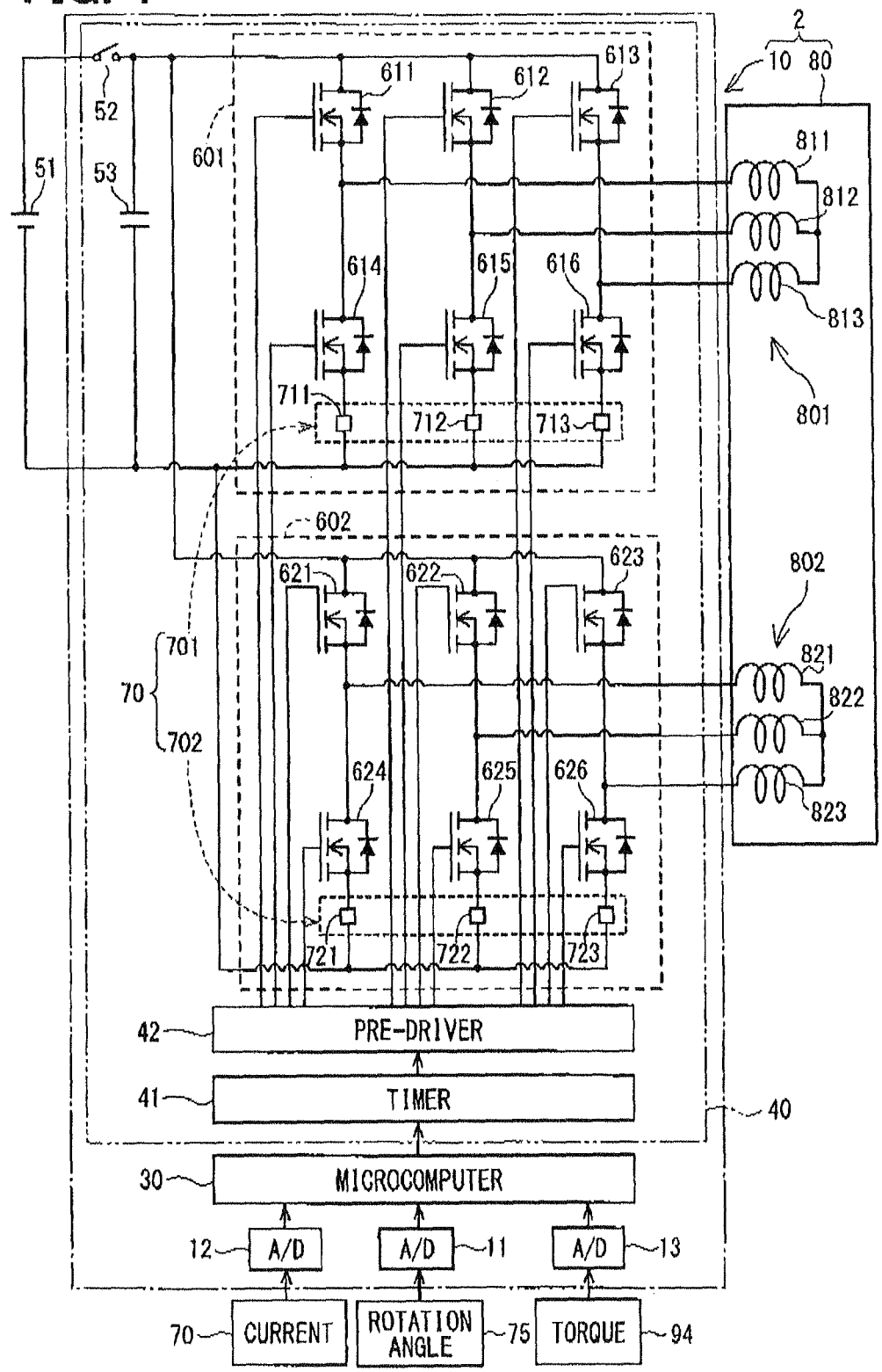
FIG. 1 is a circuit diagram of a motor control apparatus according to one embodiment.
Figure 2:
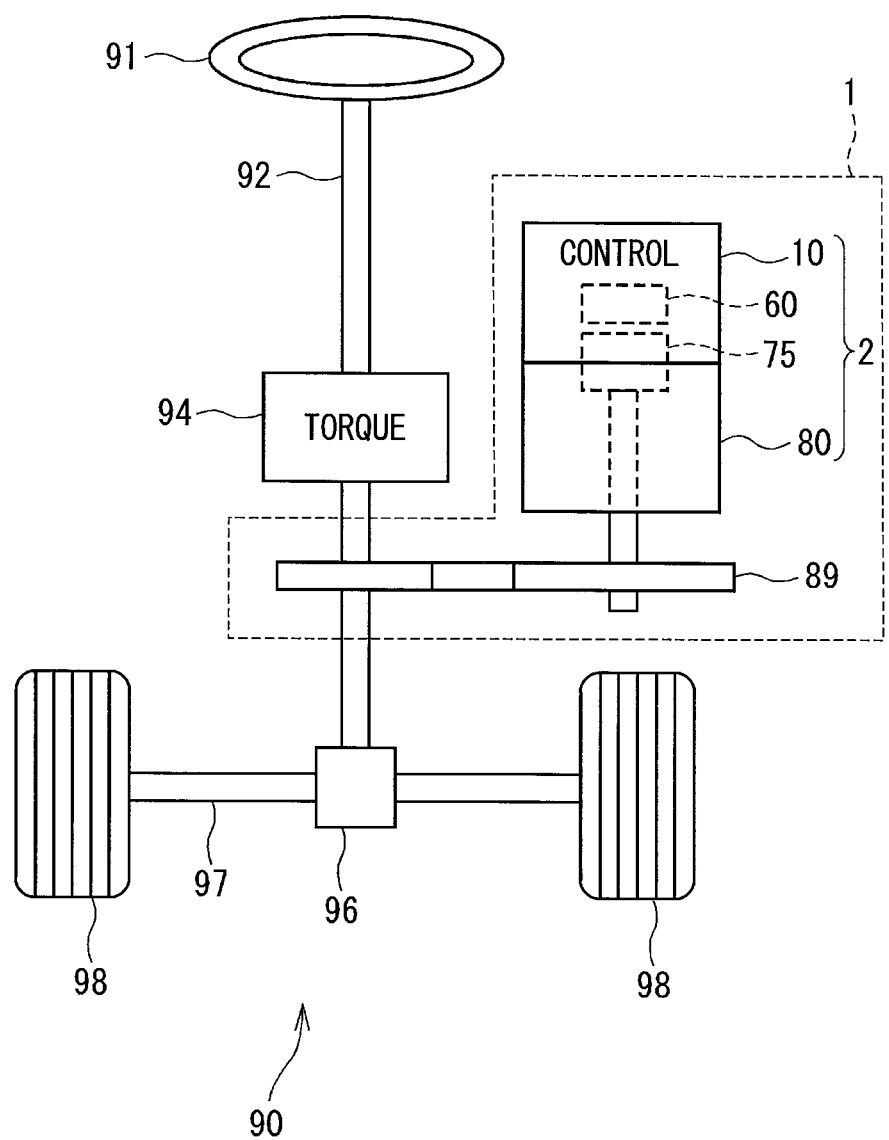
FIG. 2 is a schematic diagram of an electric power steering apparatus, to which the motor control apparatus is applied.

Referring to FIG. 1 to FIG. 4, particularly FIG. 2, a motor control apparatus 10 according to one embodiment is provided in an electric power steering apparatus 1 of a steering apparatus 90 of a vehicle.

A torque sensor 94 is attached to a steering shaft 92 coupled to a steering wheel 91 to detect a steering torque applied by a driver. A pinion gear 96 is provided at one end of the steering shaft 92 and engaged with a rack shaft 97. A pair of tire wheels 98 is coupled rotatably to the rack shaft 97 through tie rods and the like. The rotary motion of the steering shaft 92 is converted to a linear motion of the rack shaft 97 by the pinion gear 96 so that the pair of tire wheels 98 are steered by an angle in correspondence to a distance of the linear motion of the rack shaft 97.

The electric power steering apparatus 1 includes an actuator 2 and a reduction gear 89. The actuator 2 rotates a rotary shaft. The reduction gear 89 is a motive power transfer device, which transfers the rotation of the rotary shaft to the steering shaft 92 after speed reduction. The actuator 2 includes a steering assist motor 80 and the motor control apparatus 10. The motor 80 is driven under control of the motor control apparatus 10 to generate a steering assist torque for assisting a steering operation of the steering wheel 91 and transferring the same to the steering shaft 92. The motor 80 is a three-phase brushless motor. The angle of rotation of the motor 80 is detected by the rotation angle sensor 75.

Specifically, as shown in FIG. 1, the motor 80 has two coil sets 801, 802. The first coil set 801 is formed of three phase coils 811, 812, 813 of U-phase, V-phase, W-phase. The second coil set 802 is formed of three phase coils 821, 822, 823 of U-phase, V-phase and W-phase. An inverter 60 is formed of a first inverter 601 of a first power supply system (first system) and a second inverter 602 of a second power supply system (second system), which are provided in correspondence to the first coil set 801 and the second coil set 802, respectively. A unit of combination of an inverter and a three-phase coil set corresponding to the inverter is referred to as one system.

The motor control apparatus 10 is formed of A/D converters 11, 12, 13, which are input-side hardware parts (electronic circuits), a microcomputer 30, which is a software part, and a drive circuit 40, which is an output-side hardware part (electronic circuit). The A/D converters 11, 12, 13 input analog electric signals from the rotation angle rotation angle sensor 75, the current sensor 70 and the torque sensor 94 and converts them to digital electric signals, respectively. The microcomputer 30 executes control program (software) by using input signals from the A/D converters 11, 12, 13 to calculate a control amount related to driving of the motor 80 and outputs the calculation result to the drive circuit 40.

The drive circuit 40 includes a timer 41, a pre-driver 42, a power relay 52, a capacitor 53, the inverter 61 of the first system, the second inverter 602, the current sensor 70 and the like. The timer 41 generates a drive signal for the pre-driver 42 in response to a PWM command of the microcomputer 30. The pre-driver 42 drives the inverters 601 and 602 by turning on and off switching elements.

The power relay 52 is capable of interrupting power supply from a battery 51, which is for example a DC power source of 12V, to the inverters 601 and 602. The capacitor 53 is connected in parallel to the battery 51 to store electric charge therein for assisting power supply to the inverters 601 and 602 and suppressing noise components such as surge currents.

In the first inverter 601, six switching elements 611 to 616 are connected in a bridge form to switch over power supply to the coils 811, 812, 813 of the first coil set 801. The switching elements 611 to 616 are MOSFETs (metal-oxide-semiconductor field-effect transistors). Each of the switching elements 611 to 616 is referred to as a FET below. The FETs 611, 612, 613 at the high-potential side are referred to as high FETs. The FETs 614, 615, 616 at the low-potential side are referred to as low FETs.

Drains of the high FETs 611, 612, 613 are connected to the positive polarity side of the battery 51. Sources of the high FETs 611, 612, 613 are connected to drains of the low FETs 614, 615, 616, respectively. Junctions between the high FETs 611, 612, 613 and the low FETs 614, 615, 616 are connected to one ends of the coils 811, 812, 813, respectively. Gates of the FETs 611 to 616 are connected to the pre-driver 42 to be turned on and off by drive signals of the pre-driver 42.

The current sensor 70 is formed of a first current sensor 701 of the first system and a second current sensor 702 of the second system to detect phase currents, which the inverters 601 and 602 supply to the coil sets 801 and 802, phase by phase. The current sensors 701 and 702 are formed of shunt resistors. Shunt resistors 711, 712, 713 forming the first current sensor 701 are connected between the sources of the low FETs 614, 615, 616 and the negative polarity side of the battery 51. The shunt resistors 711, 712, 713 detect phase currents supplied to the coils 811, 812, 813 of the U-phase, the V-phase the W-phase. In the second inverter 602, the switching elements (FETs) 621 to 626, the shunt resistors 721, 722, 723 and the like are configured similarly to the first inverter 601 of the first system.

Figure 3A:
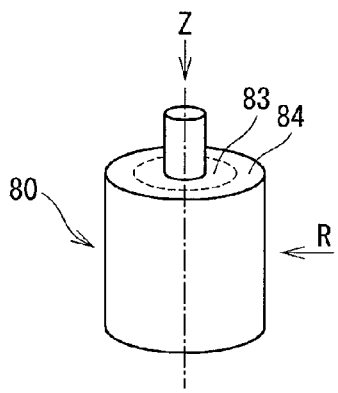
FIGS. 3A to 3C are schematic diagrams of a motor, to which the motor control apparatus is applied.
Figure 3B:
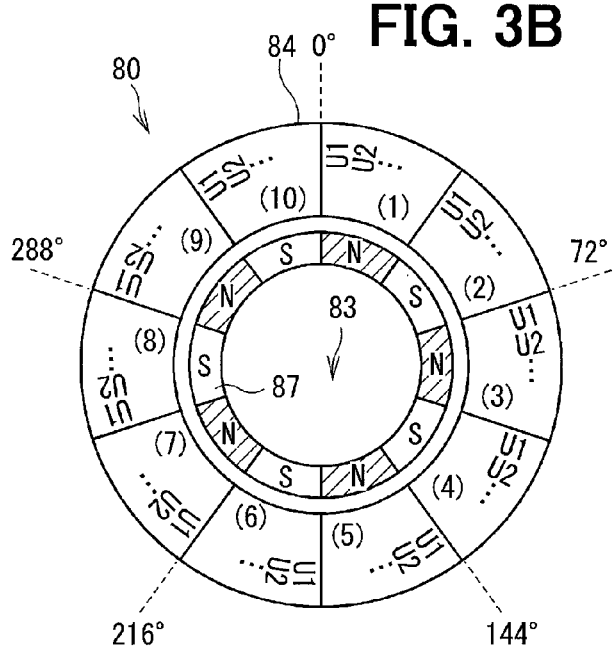
Figure 3C:
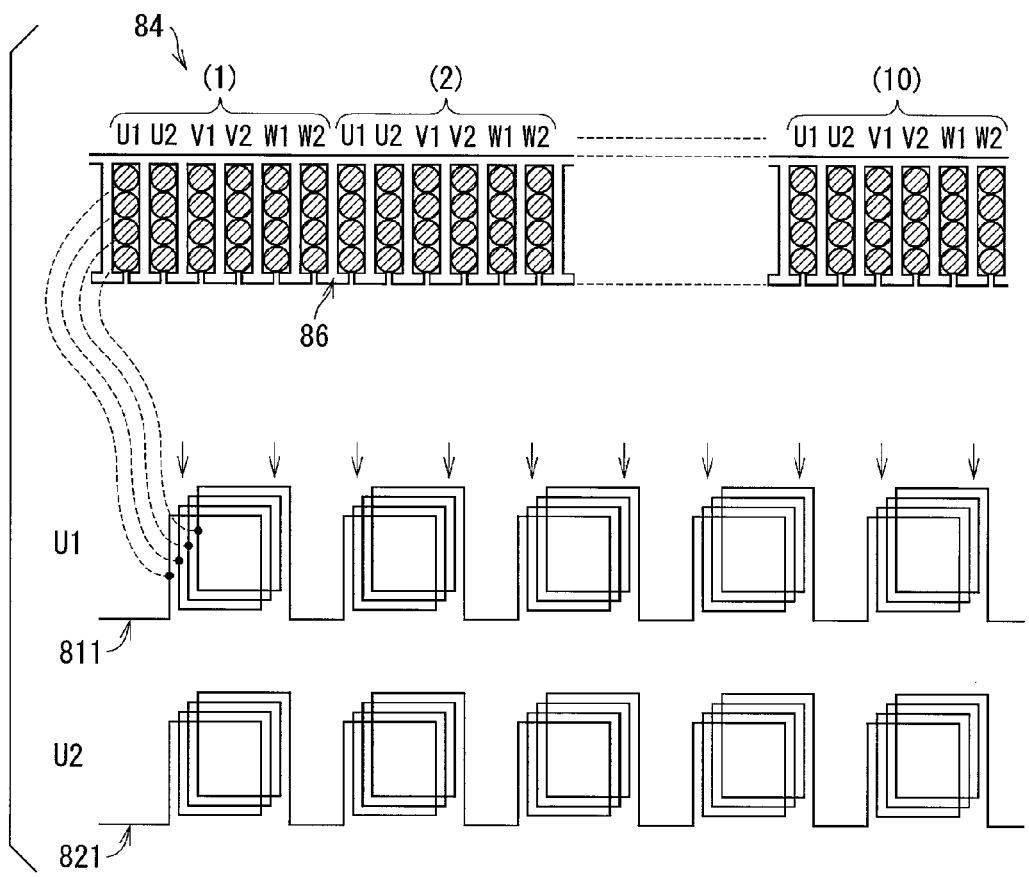

The three-phase AC brushless motor 80 is configured as shown in FIGS. 3A to 3C. As shown in FIG. 3A and FIG. 3B, a rotor 83 rotates about a rotation axis relative to a stator 84. The number of coils of the stator 84 is 12×m and the number of poles of permanent magnets 87 of the rotor 83 is 2×m with "m" being a natural number. In the example of FIGS. 3A to 3C, "m" is 5. "M" may be a natural number other than 5.

FIG. 3B is a schematic view of the permanent magnets 87 of the rotor 83 and the stator 84, which is viewed in a thrust direction Z (FIG. 3A). A total of ten (10=2×5) permanent magnets are provided so that a N-pole and a S-pole are arranged alternately in five sets in the circumferential direction. The stator coils are formed of a total of sixty coils (60=12×5), which form ten coil groups. Each coil group includes six coils. Each coil group is formed of a U1-phase coil, a U2-phase coil, a V1-phase coil, a V2-phase coil, a W1-phase coil and a W2-phase coil, which are arranged in this order in the clockwise direction. Five areas (area 0 to area 4) are defined in correspondence to two coil sets. The angular position of a start point of each area is defined as "n"×72° (n=0 to 4), assuming that 0° is set at the top center position and the angular position changes in the clockwise direction in FIG. 3B.

FIG. 3C is a development view of the stator 84 viewed in the thrust direction Z and of the coils 811 (U1-phase), 821 (U2-phase) viewed in a radial direction R in FIG. 3A. The coil forming the U1-coil, for example, is formed by one conductor wire wound about each protrusion 86, which is provided at every sixth protrusions. In the example of U-phase, the U2-coil 821 of the second coil set 802 in the circumferential direction is provided at a position, which is advanced by 30° in electrical angle, relative to the U1-coil 811 of the first coil set 801. It is thus possible to advance the phase of the three-phase AC current supplied to the second coil set 802 by 30° relative to the phase of the three-phase AC current supplied to the first coil set 801.

Figure 4:
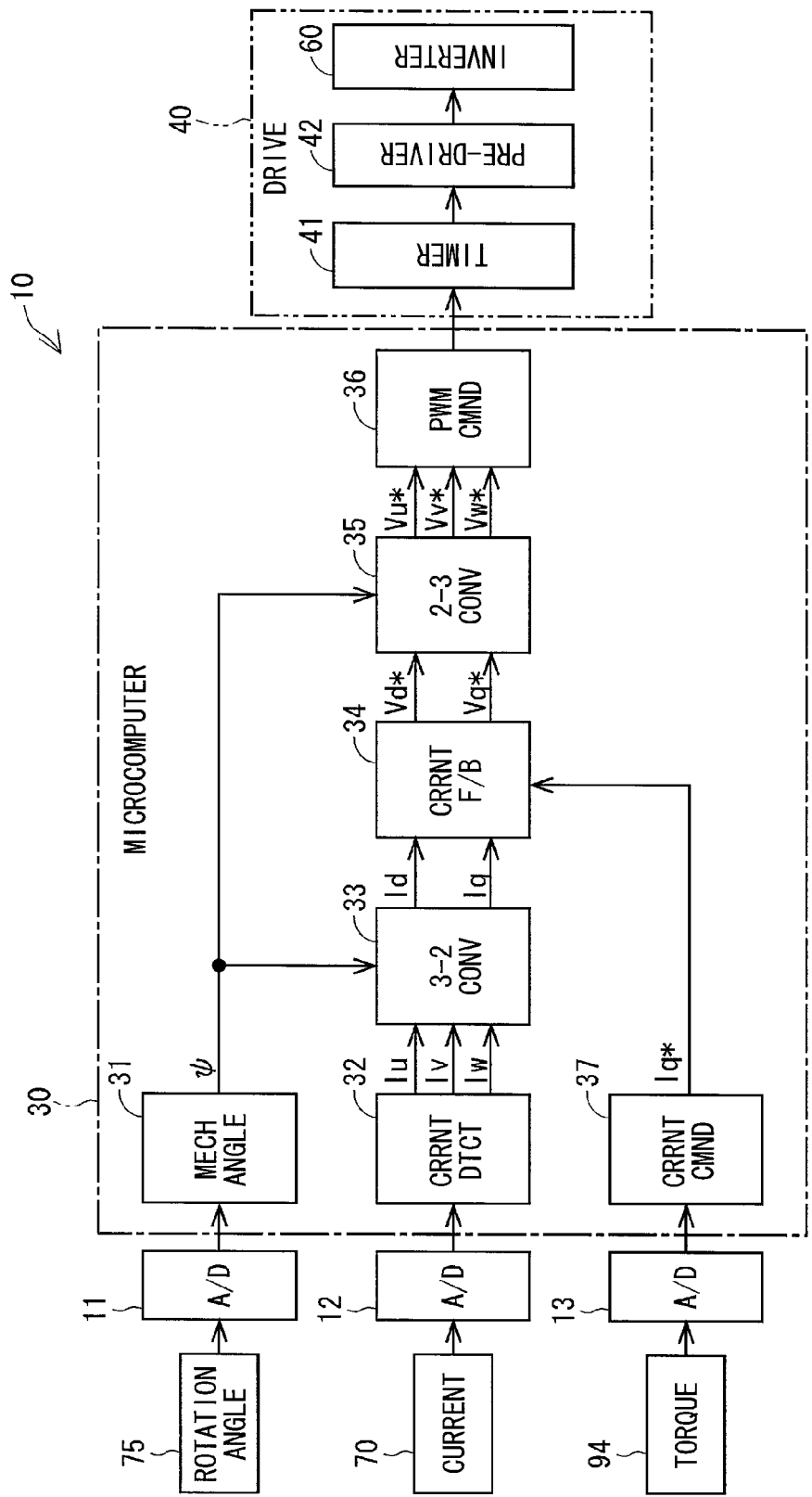
FIG. 4 is a control block diagram of the motor control apparatus including a microcomputer.

The motor control apparatus 10 is configured as shown in FIG. 4, in which the microcomputer 30 is shown in a functional block form. The arrangement of FIG. 4 is not limited to the case of two systems but is applicable to a motor control apparatus of one system.

The microcomputer 30 is programmed to execute various calculation and control functions, which are exemplified in FIG. 4. In FIG. 4, the programmed software executed by the microcomputer 30 is shown by dividing a series of control calculation program into a plurality of unit calculation blocks 31 to 37 of control processing. Each of these calculation blocks is a processing part, which calculates its output based on its input by an arithmetic operation.

Specifically, the microcomputer 30 includes, as calculation blocks, a mechanical angle calculation block 31, a current detection calculation block 32, a three-phase to two-phase conversion (3-2 phase conversion) calculation block 33, a current feedback calculation block 34, a two-phase to three-phase conversion (2-3 phase conversion) calculation block 35, a PWM command calculation block 36 and a current command value calculation block 37. Each of those calculation blocks may further be divided into more specified blocks.

The mechanical angle calculation block 31 acquires a rotation angle of the motor 80 detected by the rotation angle sensor 75 as an output of the A/D converter 11 and calculates a mechanical angle ψ. This mechanical angle ψ is outputted to the phase conversion parts 33 and 35. The current detection calculation block 32 acquires the phase current detected by the current sensor 70 as an output of the A/D converter 12 and calculates three-phase current detection values Iu, Iv, Iw. The three-phase to two-phase conversion part 33 converts the three-phase current detection values Iu, Iv, Iw to a d-q axis current detection values Id, Iq and outputs the converted values to the current feedback calculation block 34.

The current command value calculation block 37 acquires a steering torque detected by the torque sensor 94 as an output of the A/D converter 13, calculates a q-axis current command value Iq* and outputs the q-axis current command value Iq* to the current feedback calculation block 34. The current feedback calculation block 34 generates voltage command values Vd*, Vq* by proportional and integral (PI) control based on the q-axis current command value Iq* acquired from the current command value calculation block 37, a d-axis current command value Id* calculated internally, and a difference between the d-axis and q-axis current detection values Id, Iq outputted from the three-phase to two-phase conversion part 33.

The two-phase to three-phase conversion part 35 converts the voltage command values Vd*, Vq* to three-phase voltage command values Vu*, Vv*, Vw* of the U-phase, V-phase, W-phase and outputs them to the PWM command calculation block 36. The PWM command calculation block 36 calculates a PWM command indicating a duty (%). This PWM command is outputted from the microcomputer 30 to the timer 41 of the drive circuit 40 so that switching signals for the high FETs and the low FETs of the inverter 60 are generated by comparison of the PWM command with a triangular wave. The pre-driver 42 drives the inverter 60 in response to those switching signals.

For a motor control apparatus, a variety of failure detection methods are proposed for detecting a hardware failure such as a short-circuit or disconnection in FETs 611 to 616 and 621 to 626 of the inverters 601 and 602, or failure in detection parts of the current sensor 70 or the rotation angle sensor 75. For such a particular apparatus as an electric power steering apparatus, which is required to have high safety level, the apparatus need be controlled to operate always in a safe mode based on a fail-safe concept.

However an abnormality in the control software in the microcomputer 30, that is, bugs, is not taken into account so much. The motor control apparatus 10 therefore is configured to monitor an abnormality in the control software of the microcomputer 30 in parallel to control calculation processing, which is executed normally for controlling the motor 80. This software is referred to as software monitoring processing. The software monitoring processing detects a software abnormality, which is likely to cause a problem to a user, and improve reliability of the electric power steering apparatus 1 incorporating the motor control apparatus 10. The software abnormality includes, for example, a calculated value continuously fixed to a maximum value, a minimum value or other fixed values, or a calculated value reaching twice as large as its normal value or falling to one-half as small as its normal value.

The software monitoring processing is executed for each calculation block. The software monitoring processing may be executed at the same calculation interval as the normal control calculation processing. Alternatively, it may be executed at a different monitoring interval, which is longer than the normal control calculation processing, if the calculation load need be lowered. Examples of software monitoring processing, which are executed by six calculation blocks 31 to 36 except for the current command value calculation block 37, will be described in detail below with reference to FIG. 5 to FIG. 30.

In the following description, numeral 1 or 2 is attached at an end of control values such as current I, voltage V and the like, thereby to distinguish the control values between the first and the second power supply systems. The numeral 1 or 2 is not attached to the control values, if it is not necessary to distinguish the control values between the two systems. In the software monitoring processing, a zero-approximation value is defined as a small threshold value, which is not zero but close to zero, in consideration of detection noise. Thus, if the absolute value of a monitored target value is equal to or less than its zero-approximation value, the monitored target value is treated as substantially zero. For example, a zero-approximation voltage value Vapp0, a zero-approximation current value Iaap0 and a zero-approximation duty Dapp0 may be set to 0.1V, 1A and 1%, respectively.

[Mechanical Angle Calculation Block 31]

Figure 5:
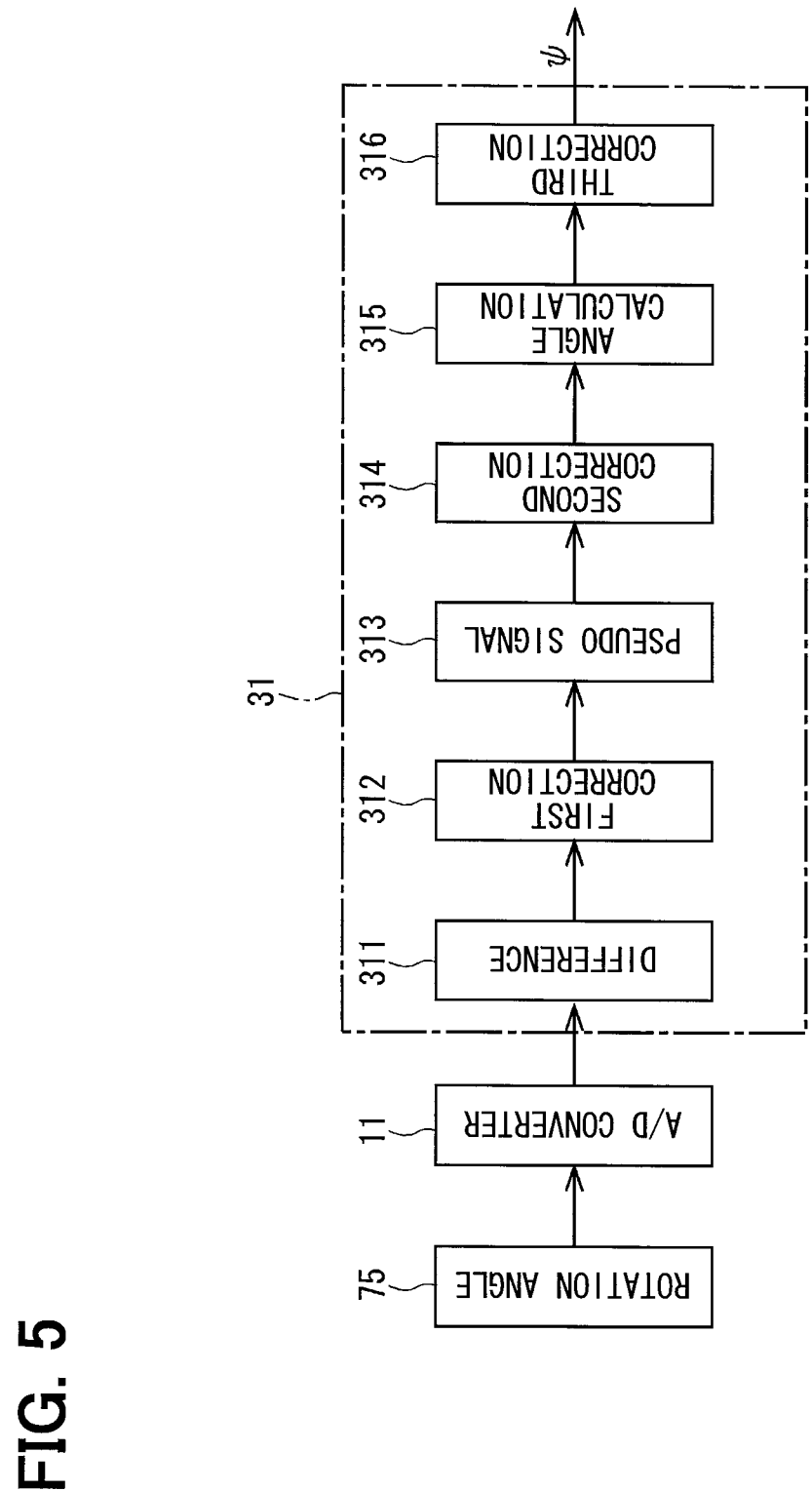
FIG. 5 is a control block diagram of a mechanical angle calculation block of the microcomputer.

Software monitoring processing of the mechanical angle calculation block 31 will be described with reference to FIG. 5 to FIG. 9. As shown in FIG. 5, the mechanical angle calculation block 31 executes calculations, which include a difference calculation 311, a first correction calculation 312, a pseudo signal calculation 313, a second correction calculation 314, an angle calculation 315 and a third correction calculation 316. A magneto-resistive element (MR) is used as a detection element of the rotation angle sensor 75. The magneto-resistive element varies its impedance in accordance with a rotary magnetic field varying with rotation of a body to be detected. An electrical angle of the magneto-resistive element corresponds to the mechanical angle ψ. Since the number of pairs of magnetic poles of the motor 80 is 5, the mechanical angle ψ corresponds to ⅕ of the motor electrical angle θ.

Figure 6:
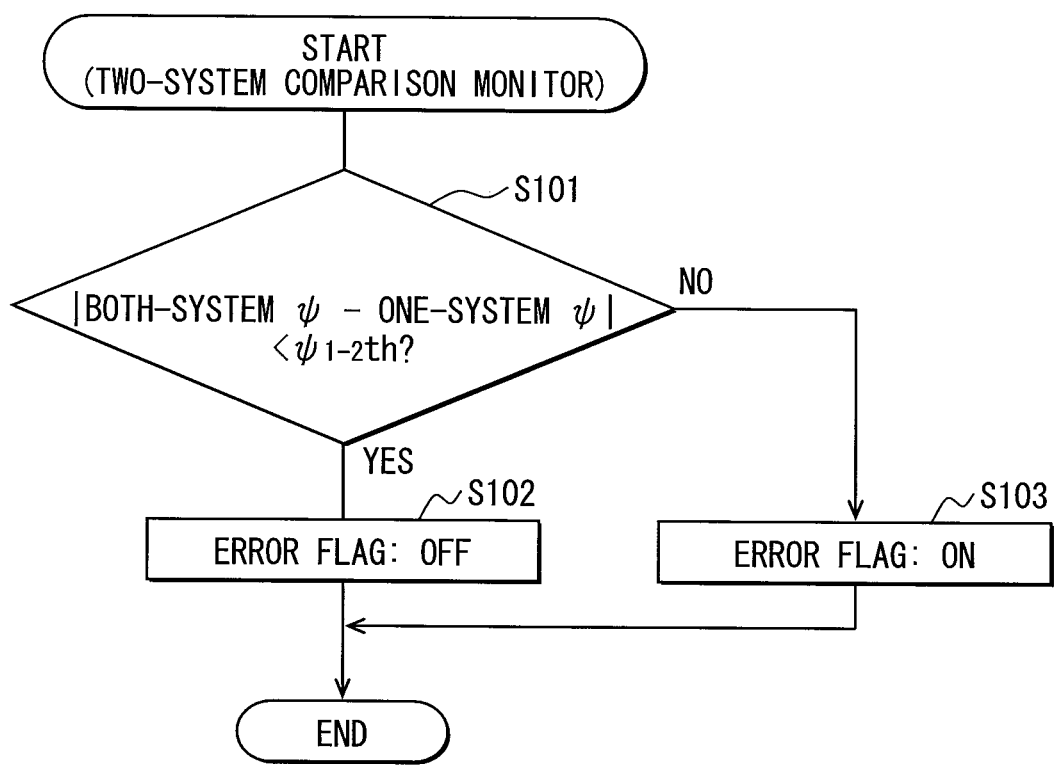
FIG. 6 is a flowchart of software monitoring processing executed by the mechanical angle calculation block of the microcomputer.

FIG. 6 is a flowchart of monitoring processing, which compares calculated mechanical angles of the two systems. In the following description, a symbol S is used to designate a step of processing. It is checked at S101 whether an angular difference is less than a predetermined angular threshold value ψ1-2th. This angular difference is a difference between a both-system mechanical angle ψ calculated for both of the first system and the second system and a one-system mechanical angle ψ calculated for one of the first system and the second system. If the angular difference is less than the threshold value ψ1-2th, an error flag of this monitoring processing is set to OFF (S102). If the angular difference is equal to or greater than the threshold value ψ1-2th, the error flag is set to ON (S103).

Figure 7:
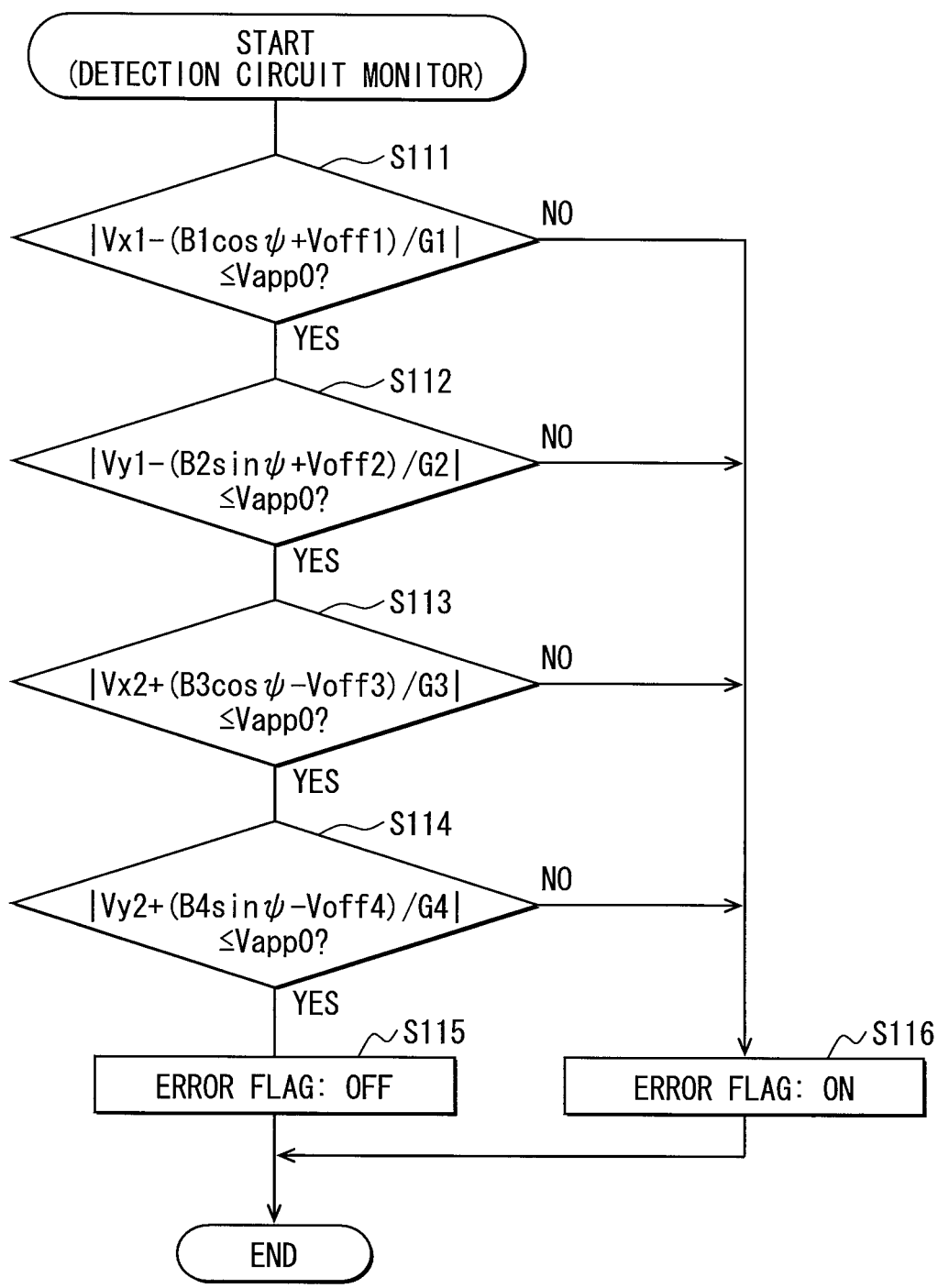
FIG. 7 is a flowchart of software monitoring processing executed by the mechanical angle calculation block.
Figure 8:
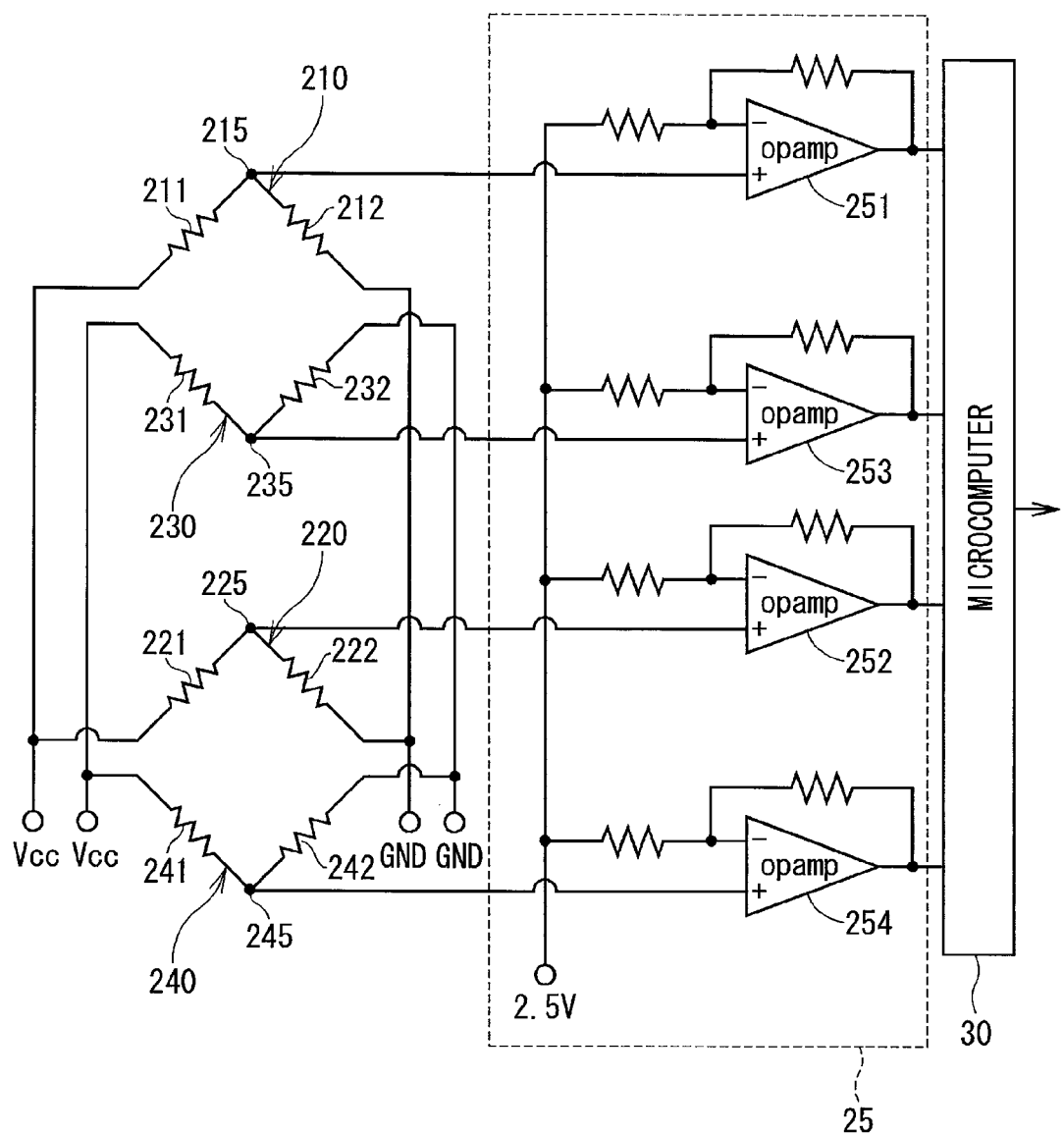
FIG. 8 is a schematic diagram of a detection circuit of a rotation angle sensor used for the motor control apparatus.

FIG. 7 is a flowchart, which monitors an output signal of a detection circuit in a rotation angle sensor disclosed in JP-A-2011-99846 (US 2011/0087456 A1). This detection circuit is formed of, as shown in FIG. 8, four half-bridge circuits 210, 220, 230, 240, an amplifier circuit 25 and a microcomputer 30, which is a control part. The first half-bridge circuit 210 has two magneto-resistive elements 211, 212, which are connected in series between a power source Vcc and the ground GND. The power source Vcc supplies a voltage of 5V, for example. The second half-bridge 220, the third half-bridge 230 and the fourth half-bridge 240 similarly have two magneto-resistive elements 221, 222, 231, 232, 241, 242 connected in series between the power source Vcc and the ground GND, respectively.

Figure 9A:
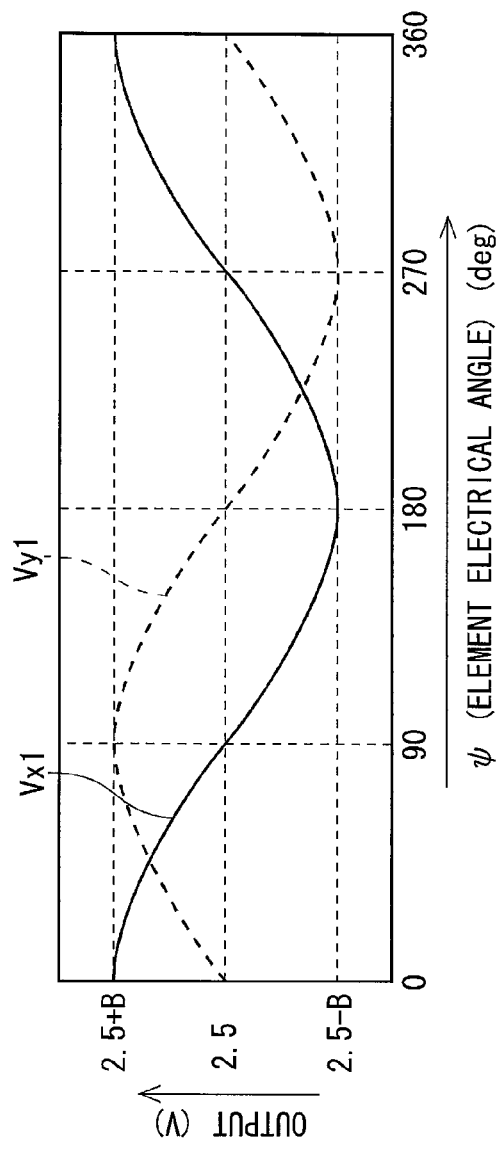
FIGS. 9A and 9B are charts of output signals of the detection circuit of the rotation angle sensor.
Figure 9B:
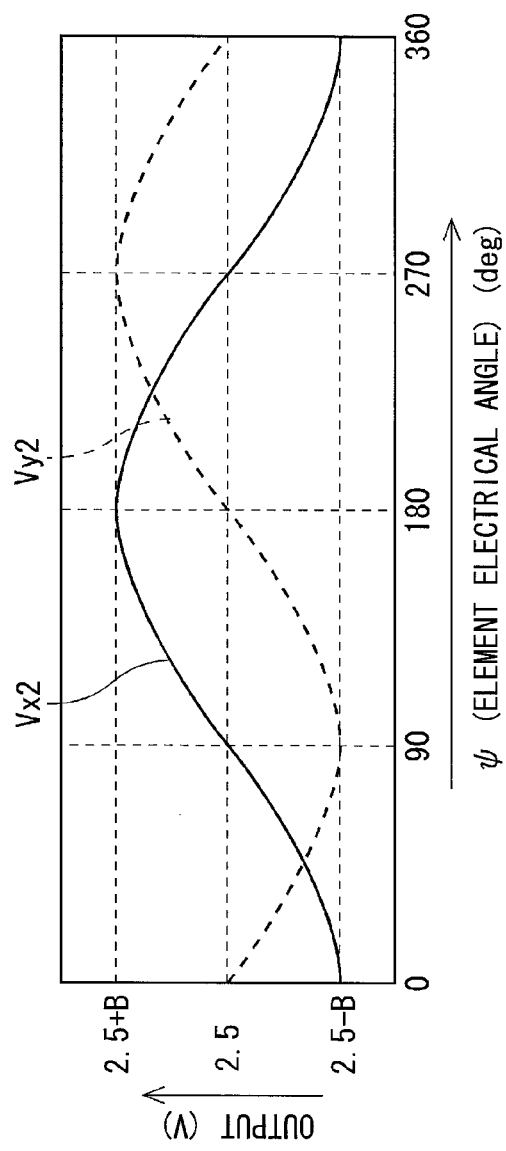

Intermediate points 215, 225, 235, 245 of the half-bridges 210, 220, 230, 240 are connected to positive sides of operational amplifiers 251, 252, 253, 254 of the amplifier circuit 25, respectively. An offset voltage of 2.5V is inputted to negative sides of the operational amplifiers 251 to 254. The amplifier circuit 25 amplifies the output signals of the intermediate points 215, 225, 235, 245 of the half-bridges 210, 220, 230, 240, and outputs the amplified signals to the microcomputer 30 after offsetting. Thus the output signals shown in FIG. 9A and FIG. 9B are outputted to the microcomputer 30.

Assuming that the output signals produced in correspondence to the output signals of the first half-bridge 210, the second half-bridge 220, the third half-bridge 230, the fourth half-bridge 240 are represented as Vx1, Vy1, Vx2, Vy2, respectively, the output signals Vx1, Vy1, Vx2, Vy2 are expressed by the following equations (1.1) to (1.4) as a function of the rotation angle ψ.

$$Vx1 = B1 \cos\psi + 2.5 + C1 \quad (1.1)$$

$$Vy1 = B2 \sin\psi + 2.5 + C2 \quad (1.2)$$

$$Vx2 = -B3 \cos\psi + 2.5 + C3 \quad (1.3)$$

$$Vy2 = -B4 \sin\psi + 2.5 + C4 \quad (1.4)$$

In those equations, B1 to B4 are amplitudes, and the rotation angle ψ corresponds to the electrical angle of the magneto-resistive element, that is, the mechanical angle ψ.

The microcomputer 30 calculates a difference between the equations (1.1), (1.3) and a difference between the equations (1.2), (1.4) to cancel out the offset voltages, calculates a ratio between the differences by the following equation (1.5) and calculates the mechanical angle ψ.

$$(Vy1-Vy2)/(Vx1-Vx2) = 2B'\sin\psi/2B'\cos\psi = \tan\psi \quad (1.5)$$

Assuming that the correction value of the offset voltage 2.5V is Voff and the gain correction value is G, the equations (1.1) to (1.4) are rewritten to the following equations (1.6) to (1.9), respectively.

$$|Vx1-(B1\cos\psi+Voff1)/G1|=0 \quad (1.6)$$

$$|Vy1-(B2\sin\psi+Voff2)/G2|=0 \quad (1.7)$$

$$|Vx2-(B3\cos\psi-Voff3)/G3|=0 \quad (1.8)$$

$$|Vy2-(B4\sin\psi-Voff4)/G4|=0 \quad (1.9)$$

If the calculations are performed normally, a conditional equation, which assumes the right side terms of the equations (1.6) to (1.9) to be less than the zero-approximation voltage value Vapp0, holds. In a flowchart of FIG. 7, therefore, it is checked at S111 to S114 whether these four conditional equations hold. If all the conditional equations hold, an error flag of this monitoring processing is set to OFF (S115). If any one of the conditional equations does not hold, the error flag is set to ON (S116).

[Current Detection Calculation Block 32]

Figure 10:
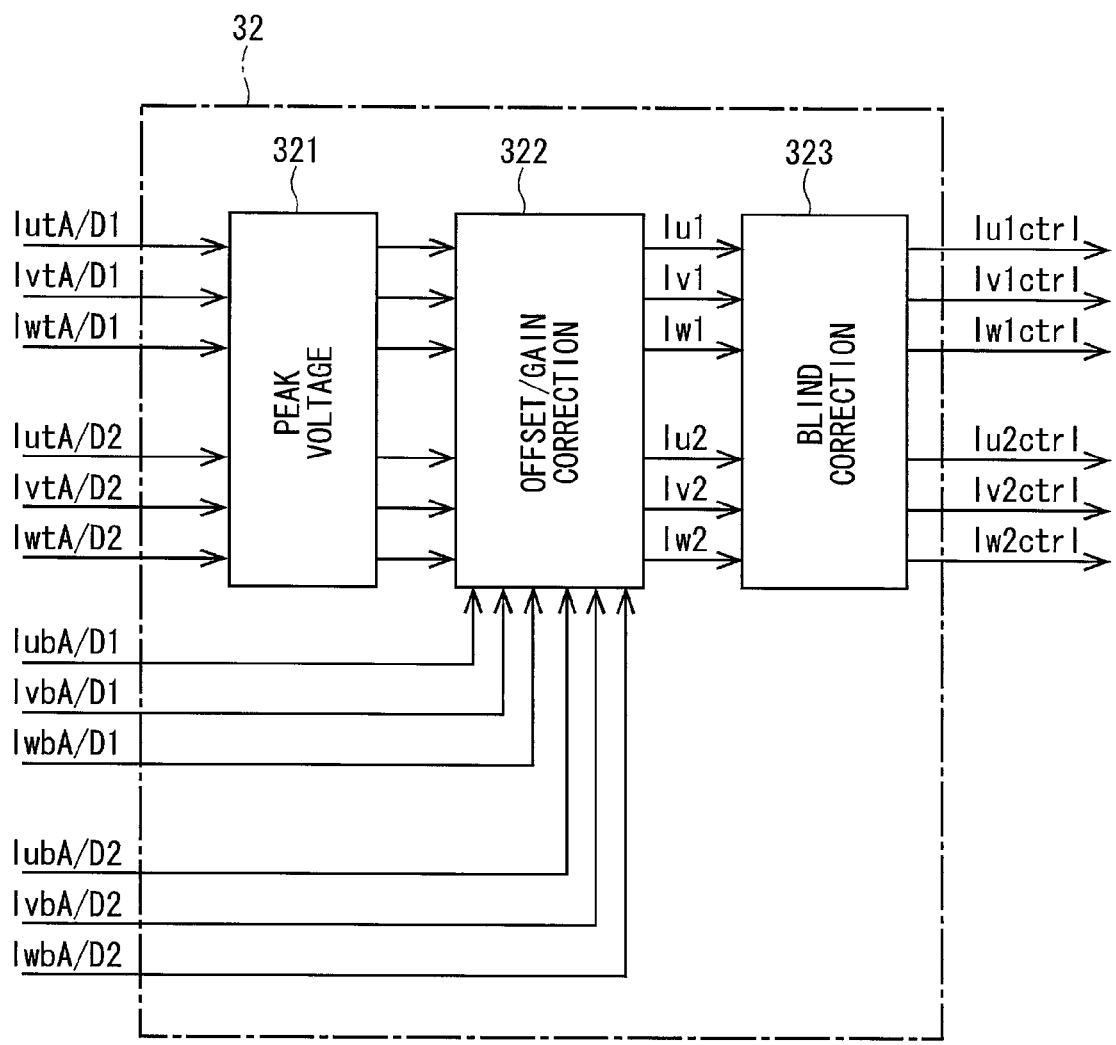
FIG. 10 is a control block diagram of a current detection calculation block of the microcomputer.

Software monitoring processing of the current detection calculation block 32 will be described with reference to FIG. 10 to FIG. 14. As shown in FIG. 10, the current detection calculation block 32 executes calculations, which include a peak voltage calculation 321, an offset/gain correction calculation 322 and a blind correction calculation 323. The current detection calculation block 32 inputs a peak (maximum) current A/D value (ItA/D) and a valley (minimum) current A/D value (IbA/D) of each phase of each system, and outputs a control current (IctrI) of each phase of each system.

The drive circuit 40 generates on/off signals for the FETs in the inverter 60 by PWM control including comparison with a triangular wave. Current detection timing in the PWM control will be described with reference to FIG. 13. In the PWM control, PWM commands PWMu, PWMv, PWMw of respective phases are compared with a carrier wave to generate on/off signals for the FETs. The high (H) FETs are tuned off and the corresponding low (L) FETs are turned on during a period, in which the triangular wave Cr is greater than the PWM commands PWMu, PWMv, WMw of respective phases. The high FETs are tuned on and the corresponding low FETs are turned off during a period, in which the triangular wave Cr is less than the PWM commands PWMu, PWMv, PWMw of respective phases.

Figure 13:
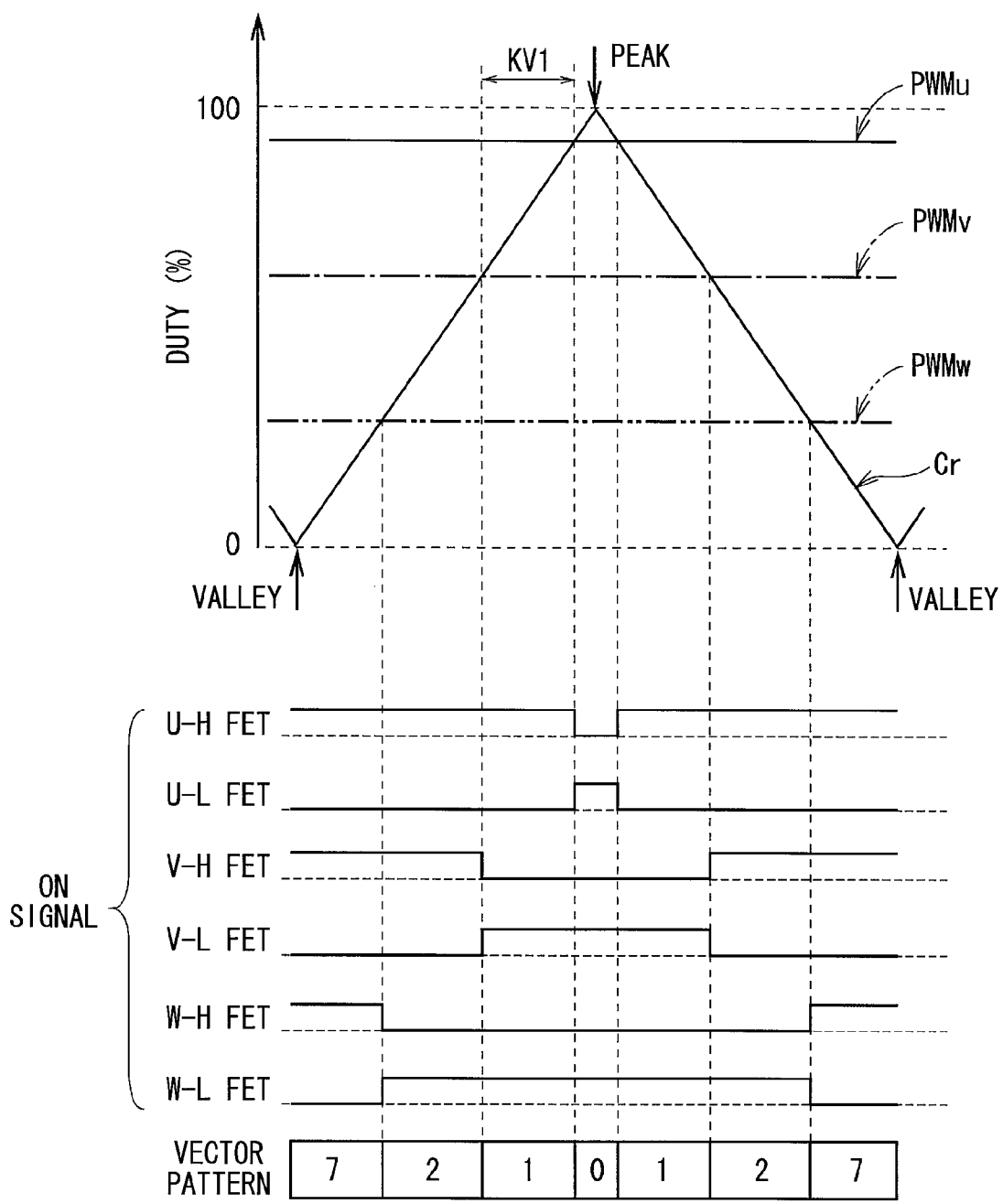
FIG. 13 is a time chart showing current detection timings in PWM control executed by the current detection calculation block.

In the example of FIG. 13, the PWM commands decreases in the order from the U-phase to the W-phase through the V-phase. For example, in a period KV1, the triangular wave Cr is less than the U-phase PWM command PWMu and greater than the V-phase PWM command PWMv and W-phase PWM command PWMw. As a result, in the U-phase, the high FET (U-H FET) is turned on and the low FET (U-L FET) is turned off during the period KV1. In the V-phase and the W-phase, the high FET is turned off and the low FET is turned on. Thus the on/off state of the FET is expressed as a voltage vector pattern (for example, refer to JP-A-2012-50252 corresponding to US 2012/0049782 A1).

The shunt resistors 711, 712 and 713 are provided at the low FETs 614, 615, 616 sides. The current flowing in the low FET is calculated by detecting the peak voltage outputted from the A/D converter 12 at the timing of a peak of the triangular wave Cr, that is, in a period of generation of the zero voltage vector V0, in which all three phases of the high FETs are turned off and all three phases of the low FETs are turned on. This current is referred to as a peak current. The valley current is calculated for correction by detecting the valley voltage outputted from the A/D converter 12 at the timing of valley of the triangular wave Cr, that is, in a period of generation of the zero voltage vector V7, in which all three phases of the low FETs are turned off and all three phases of the high FETs are turned on.

The shunt resistor needs about 5 μs as a shortest period in consideration of its ringing time or dead time A period of the triangular wave is 50 μs, the period of generation of the zero vector V0 corresponding to the duty 90% is 5 μs. If the duty exceeds 90%, the period of generation of the zero voltage vector V0 becomes less than 5 μs. For this reason, it is not possible to ensure a shortest current detection time of the shunt resistor 29.

In this case, therefore, the current is not detected during the period of generation of the zero voltage vector V0. Instead, it is proposed (for example, JP 4715677 corresponding to JP-A-2008-048504) to detect the current in a period, in which the low FETs of two phases among the three phases are turned on and the low FET of the other phase is turned off. According to this method, currents flowing in the shunt resistors of two phases, in which the low FETs are turned on, are detected. With these two detected currents, a current flowing to one phase, in which the low FET is turned off, is estimated by the following equation (2.1) according to Kirchoff's law. This is referred to as blind correction.

$$Iu+Iv+Iw=0 \quad (2.1)$$

Figure 14:
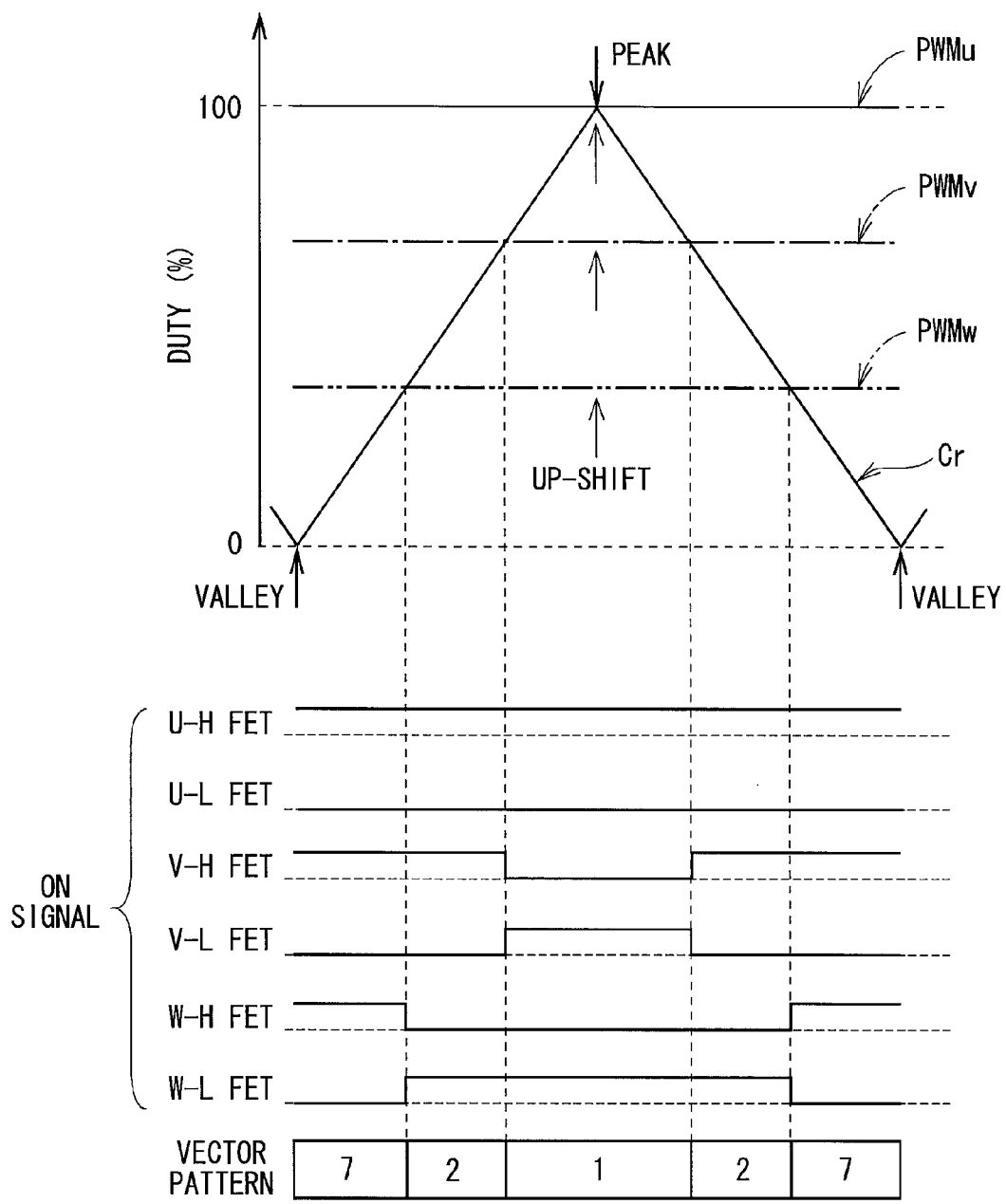
FIG. 14 is a time chart showing a blind correction by upward shifting of a PWM command executed by the current detection calculation block.

The blind correction is executed in the period of generation of the voltage vector V1, the period of generation of the voltage vector V3 and the period of generation of the voltage vector V5, when the current in the U-phase, the current in the V-phase and the current in the W-phase are estimated, respectively. That is, the blind correction is executed in the odd-numbered vector generation period. To secure the odd-numbered voltage vector generation period as long as possible in the blind correction, upward shift processing is executed as shown in FIG. 14. In the example of FIG. 14, the PWM commands decrease in the order from the U-phase to the W-phase through the V-phase. In this case, a voltage average value is shifted up to the higher voltage side so that the PWM command PWMu of the U-phase, which is the maximum, is shifted up to 100%. Thus the generation period of the pre-shift zero voltage vector V0 is eliminated and the generation periods of the voltage vector V1 become before and after the generation period of the zero voltage vector V0 become a continuous period. As a result, the current is detected during the generation period of the voltage vector V1.

Figure 11A:
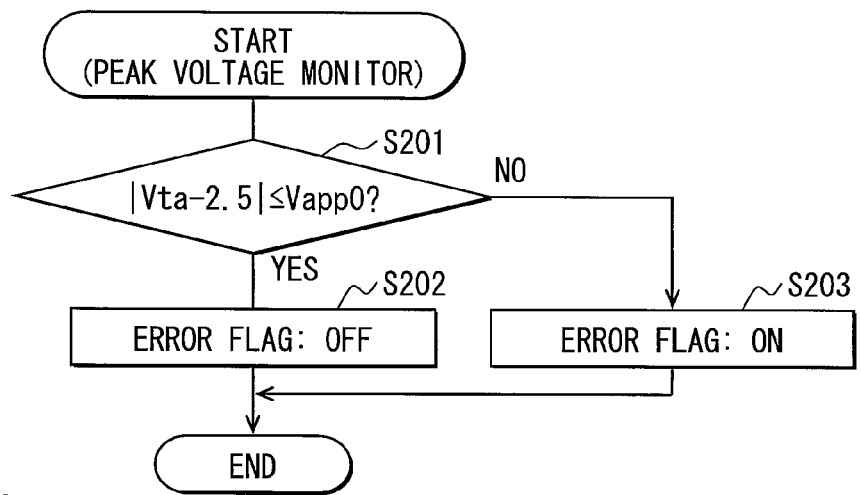
FIGS. 11A to 11C are flowcharts of software monitoring processing executed by the current detection calculation block.

FIG. 11A is a flowchart for monitoring whether the peak voltage calculation 321 is normal. At S201, an average value Vta of the peak voltage is compared with an offset value 2.5 V. If an absolute value of a voltage difference is less than the zero-approximation voltage value Vapp0, an error flag of this monitoring flag is set to OFF (S202). If the absolute value is greater than Vapp0, the error flag is set to ON (S203).

Figure 11B:
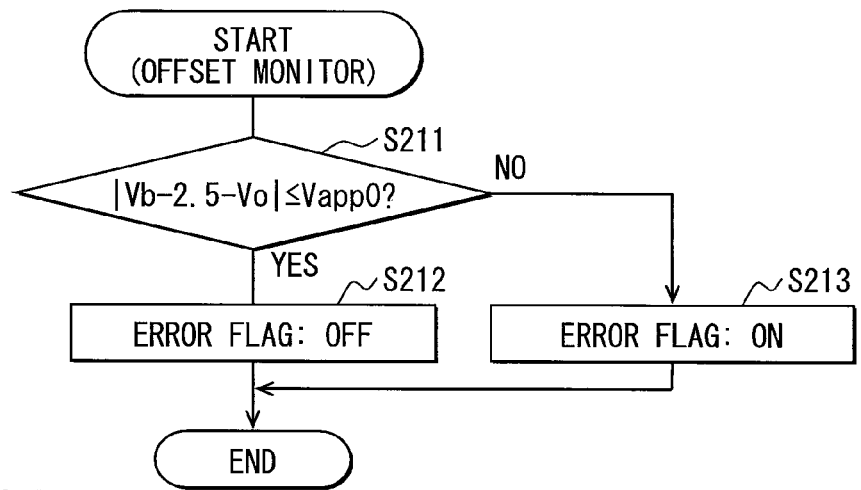

FIG. 11B is a flowchart for monitoring whether the offset correction calculation 322 is normal. At S211, the valley voltage Vb is compared with a voltage value, which is a sum of the voltage value V0 before the gain correction and the offset value 2.5 V. If an absolute value of a voltage difference is less than the zero-approximation voltage value Vapp0, an error flag of this monitoring processing is set to OFF (S212). If the absolute value is greater than Vapp0, the error flag is set to ON (S213).

Figure 11C:
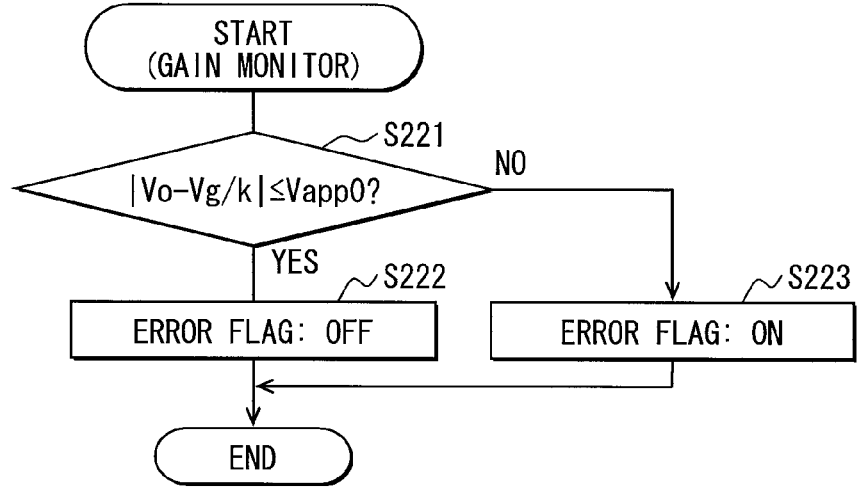

FIG. 11C is a flowchart for monitoring whether the gain correction calculation 322 is normal. At S221, the voltage value V0 before gain correction is compared with a value, which is a quotient of the voltage value Vg after gain correction by a coefficient k. If an absolute value of a voltage difference is less than the zero-approximation voltage value Vapp0, an error flag of this monitoring processing is set to OFF (S222). If the absolute value is greater than Vapp0, the error flag is set to ON (S223).

Figure 12:
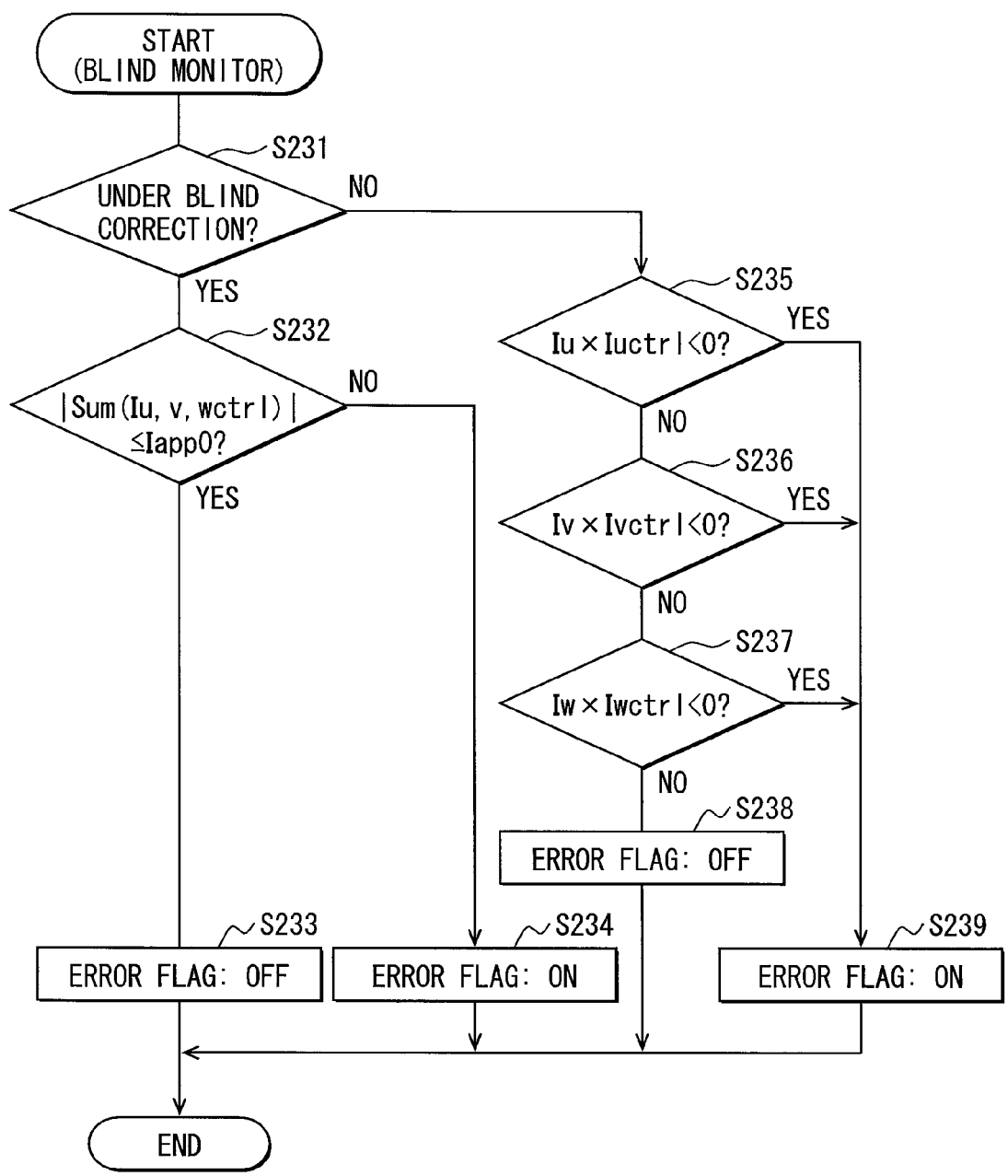
FIG. 12 is a flowchart of software monitoring processing executed by the current detection calculation block.

FIG. 12 is a flowchart for monitoring whether the blind correction calculation 323 is normal. If the blind correction is executed (S231: YES), the sum of the control currents of the three phases becomes zero based on the Kirchoff's law at the junction among the U-phase, V-phase, W-phase, if the calculation is normal. Therefore, if an absolute value of a sum Sum Iuctrl, Ivctrl, Iwcontrl) of the control currents of the three phases is less than the zero-approximation current value Iapp0, an error flag of this monitoring processing is set to OFF (S233). If the absolute value is greater than the zero-approximation current value Iapp0, the error flag is set to ON (S234).

If no blind correction is executed (S231:YES), it will never arise that the product value of the detection current Iu, Iv, Iw and the control current Iuctrl, Ivctrl, Iwctrl in each phase become negative as long as the calculation is executed normally. If all of S235, S236 and S237 result in NO, the error flag is set to OFF (S238). If any one of S235, S236 and S237 results in YES, the error flag is set to ON (S239).

[Three-Phase to Two-Phase Conversion Calculation Block 33]

Figure 15:
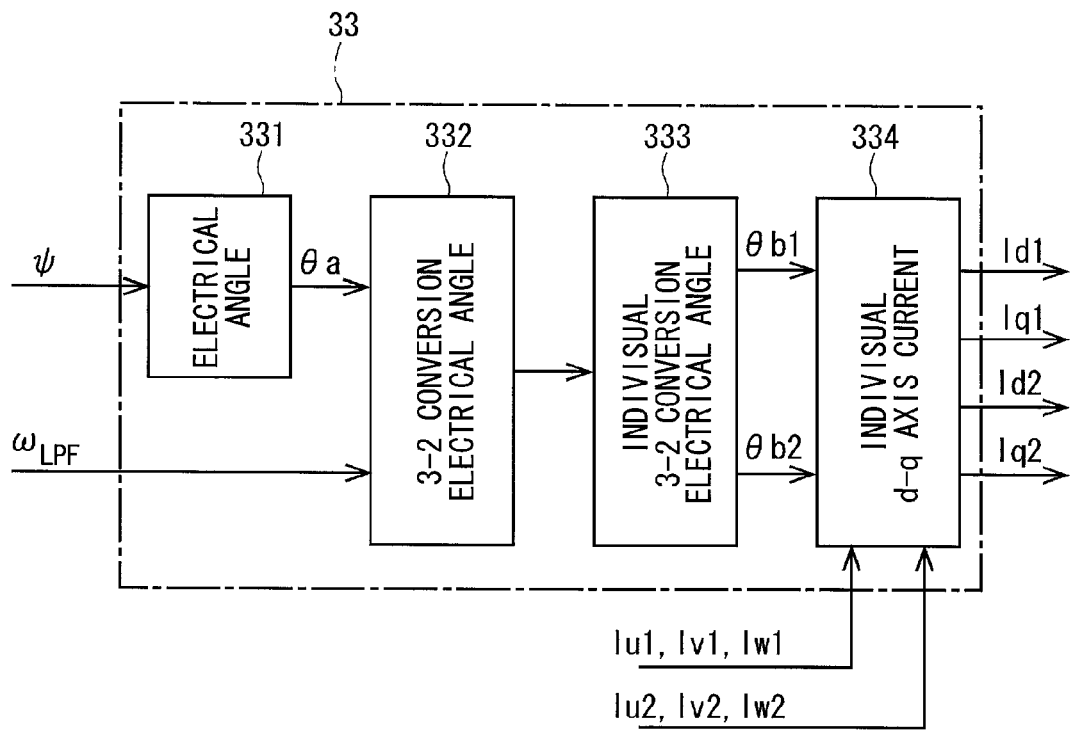
FIG. 15 is a control block diagram of a three-phase to two-phase conversion calculation block of the microcomputer.

Software monitoring processing of the three-phase to two-phase conversion part 33 will be described with reference to FIG. 15 to FIG. 17. As shown in FIG. 15, the three-phase to two-phase conversion part 33 executes calculations, which include a motor electrical angle calculation 331, a three-phase to two-phase conversion (3-2 phase conversion) electrical angle calculation 332, an individual system three-phase to two-phase conversion electrical angle calculation 333, and an individual system three-phase to two-phase conversion calculation, which is an individual d-q axis current calculation 334.

The motor electrical angle calculation 331 calculates a corrected motor electrical angle θa based on the corrected mechanical angle ψ outputted from the mechanical angle calculation block 31. The corrected motor electrical angle θa corresponds to five times of the mechanical angle ψ. The electrical angle calculation 332 for three-phase to two-phase conversion and the electrical angle calculation 333 calculates first and second electrical angles θb1 and θb2 for three-phase to two-phase conversion based on the corrected motor electrical angle θa and the motor rotation angular velocity ωLPF filtered by a low-pass filter. Since the motor 80 is configured as shown in FIG. 3, the electrical angle θb2 of the second system is advanced by an amount of 30° relative to the electrical angle θb1 of the first system. This electrical angle difference 30° is expressed by the following equation (3.1) by using θa±15°.

$$\theta b2 - \theta b1 = (\theta a + 15°) - (\theta a - 15°) \quad (3.1)$$

Figure 16A:
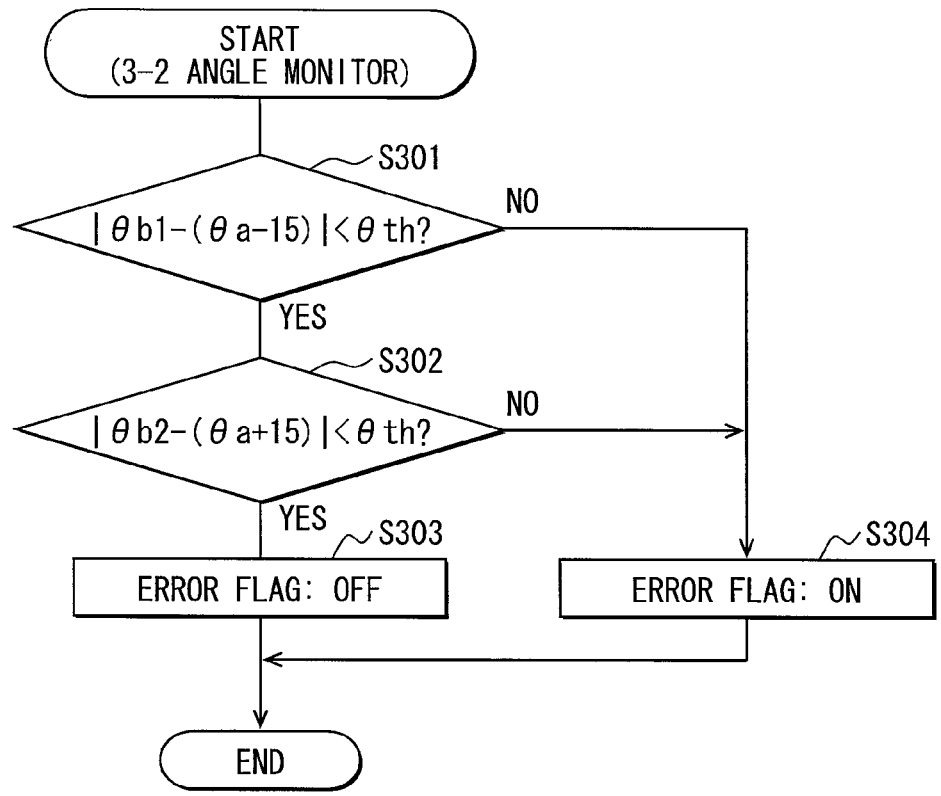
FIGS. 16A and 16B are flowcharts of software monitoring processing executed by the three-phase to two-phase conversion calculation block.

FIG. 16A is a flowchart for monitoring a calculation of this stage. If this calculation is normal, an absolute value of an angle difference between θb1 and (θa−15°) in the first system and an absolute value of an angle difference between θb2 and (θa+15°) in the second system are both less than a predetermined angle threshold value θth. Therefore, at S301 the angle difference between θb1 and (θa−15°) is compared with the threshold value θth. At S302, the angle difference between θb2 and (θa+15°) is compared with the threshold value θth. If both of the absolute values of the angle differences are less than the threshold value θth, an error flag of this monitoring processing is set to OFF (S303). If at least either one of the absolute values of the angle differences is greater than the threshold value θth, the error flag is set to ON (S304)

The individual d-q axis current calculation 334 converts the three-phase current detection values Iu, Iv Iw in each system to the d-q axis current detection values Id, Iq by using the electrical angles θb1 and θb2.

Figure 16B:
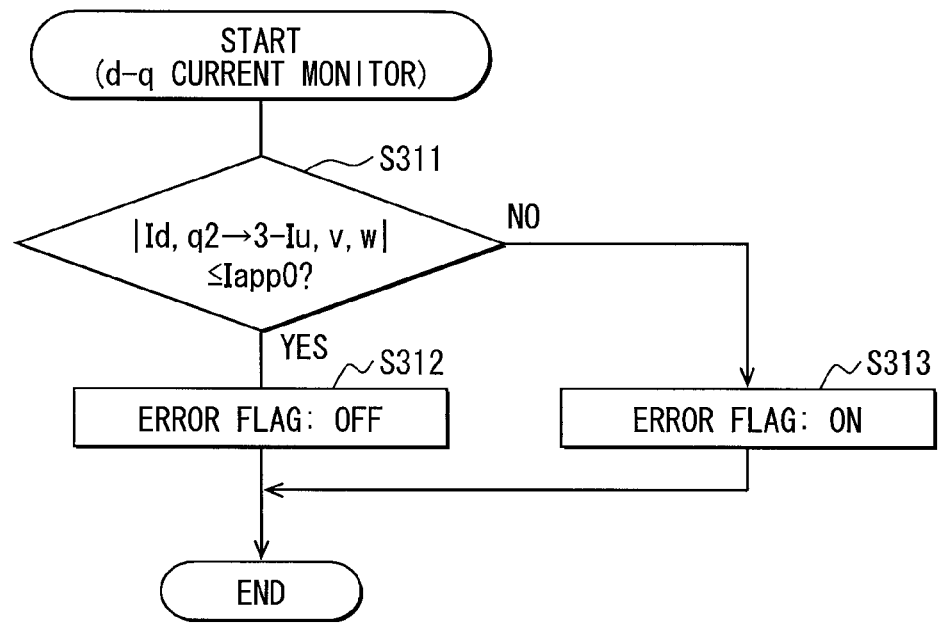

FIG. 16B is a flowchart for monitoring whether the d-q axis current calculation is normal. At S311, the current detection values Id, Iq are converted to corresponding three-phase current detection values in each system by 2-3 phase conversion, that is, by reverse d-q conversion of the d-q axis current detection values Id, Iq. These calculated three-phase current detection values are compared with the three-phase current detection values Iu, Iv, Iw. If an absolute value of a difference between the compared currents is less than the zero-approximation current value Iapp0, an error flag of this monitoring processing is set to OFF (S312). If it is greater than Iapp0, the error flag is set to ON (S313).

Figure 17:
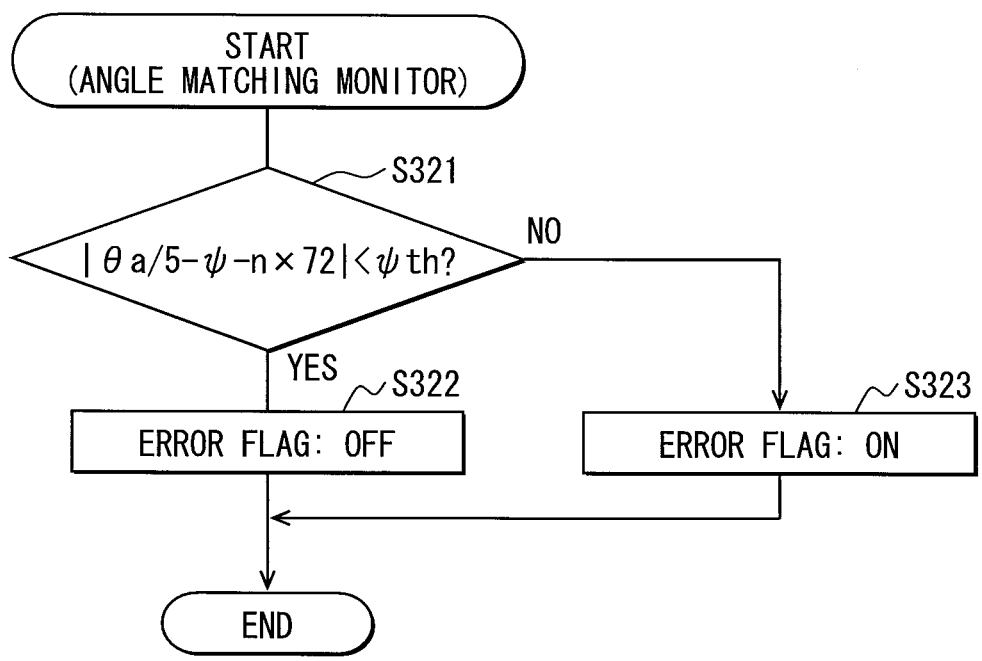
FIG. 17 is a flowchart of software monitoring processing executed by the three-phase to two-phase conversion calculation block.

FIG. 17 is a flowchart for monitoring matching between the calculated electrical angle θ and the mechanical angle ψ with respect to each of five areas of the motor. At S321, "n" indicates an area number 1, 2, 3 and 4. With respect to each area, if the difference between 1/5 of the electrical angle θ and the mechanical angle ψ+n×72°, which assumes the start point of the area as a reference, is less than a predetermined mechanical angle ψth, an error flag of this processing is set to OFF (S322). If it is greater than the mechanical threshold ψth, the error flag is set to ON (S323).

[Current Feedback Calculation Block 34]

Figure 18:
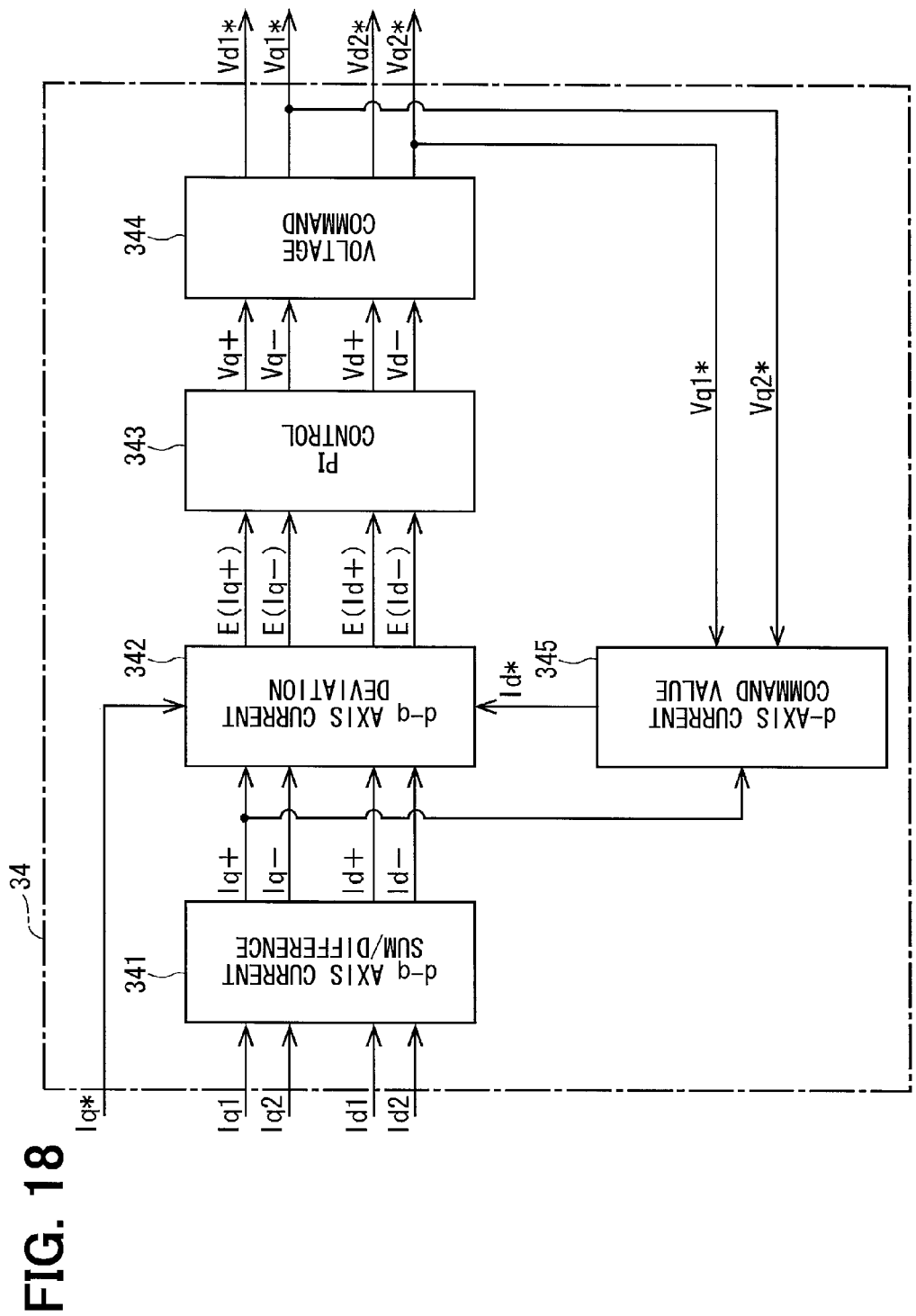
FIG. 18 is a control block diagram of a current feedback calculation block of the microcomputer.

Software monitoring processing of the current feedback calculation block 34 will be described with reference to FIG. 18 to FIG. 24. In these figures, F/B means feedback. As shown in FIG. 18, the calculations executed by the current feedback calculation block 34 includes a d-q axis current sum/difference calculation 341, a d-q axis current deviation calculation 342, a PI control calculation 343, an individual system voltage command calculation 344 and a d-axis current command value calculation 345.

The current feedback calculation block 34 inputs the d-q axis current detection values Iq and Id from the three-phase to two-phase conversion calculation block 33 and outputs the d-q axis voltage command values Vq* and Vd* to the two-phase to three-phase conversion calculation block 35. The entire control processing will be described with reference to FIG. 24 later. Here generation of the d-q axis current command values Iq* and Id* will be described. The q-axis current command value Iq* is generated by the current command value calculation block 37 and inputted to the d-q axis current deviation calculation 342. The d-axis current command value Iq* is generated by the d-axis current command value calculation block 345 and inputted to the d-q axis current deviation calculation 342. The d-axis current command value calculation 345 calculates the d-axis current command value Id* based on the sum of Iq, which is calculated as Iq+ by the d-q axis current sum/difference calculation 341, and the q-axis voltage command values Vq1, Vq2 of each system outputted from the individual system voltage command calculation 341.

Figure 19A:
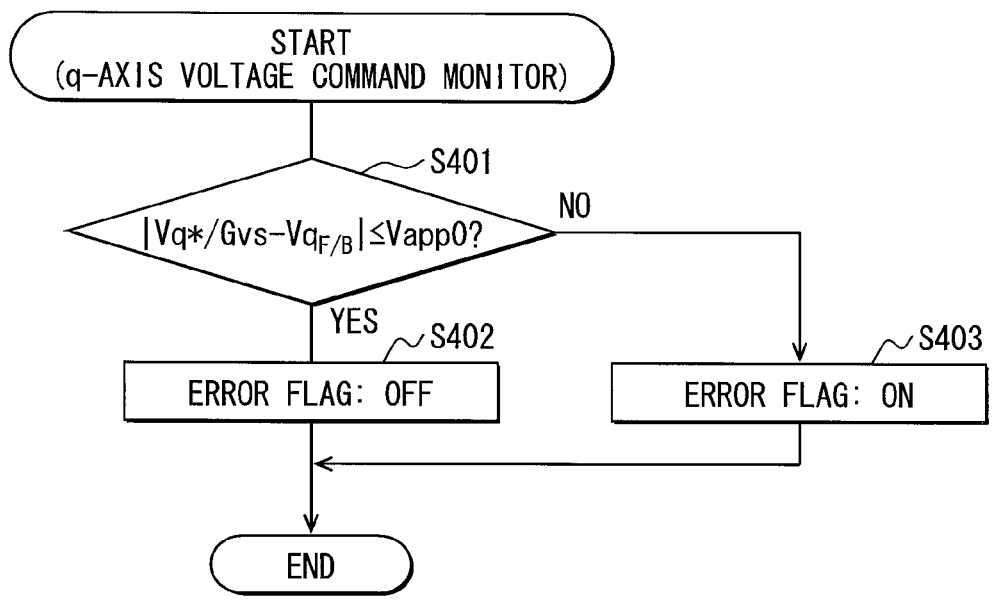
FIGS. 19A and 19B are flowcharts of software monitoring processing of the current feedback calculation block.

FIG. 19A is a flowchart for monitoring appropriateness of the q-axis voltage command value Vq* of each system outputted from the individual system voltage command calculation 344. At S401, a quotient of dividing the q-axis voltage command value Vq* by a voltage-responsive gain Gvs is compared with the q-axis voltage value VqF/B for feedback control. If an absolute value of the voltage difference is less than the zero-approximation voltage value Vapp0, an error flag of this monitoring processing is set to OFF (S402). If it is greater than Vapp0, the error flag is set to ON (S403).

Figure 19B:
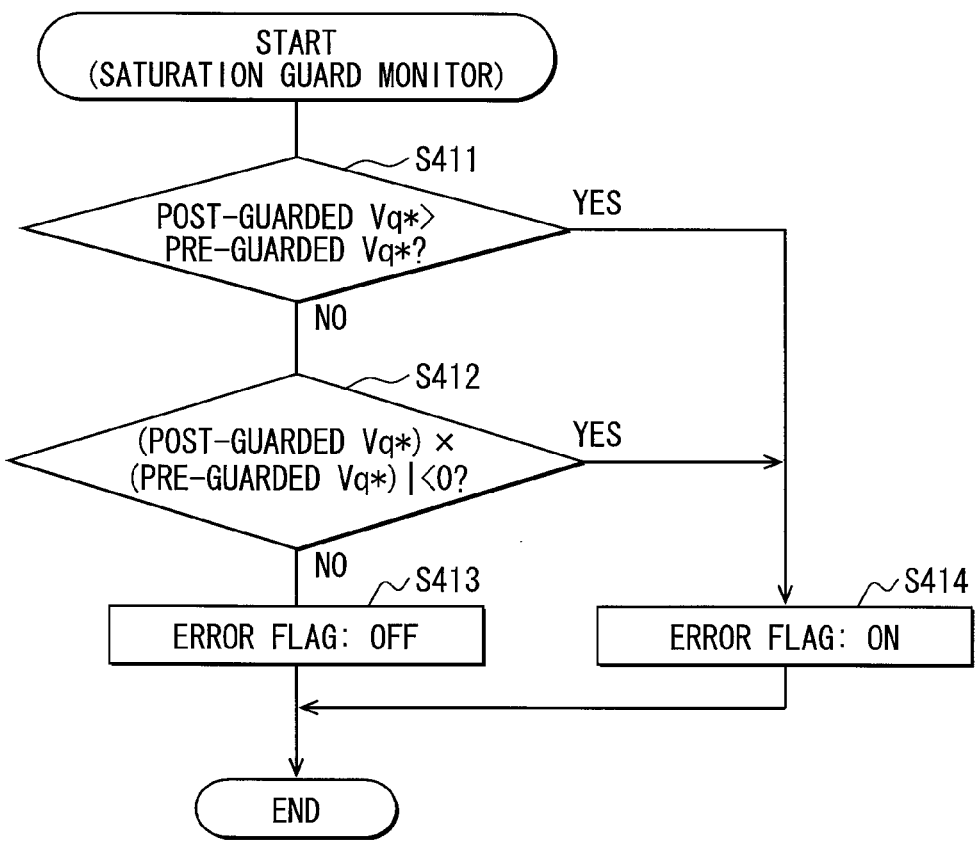
Figure 23:
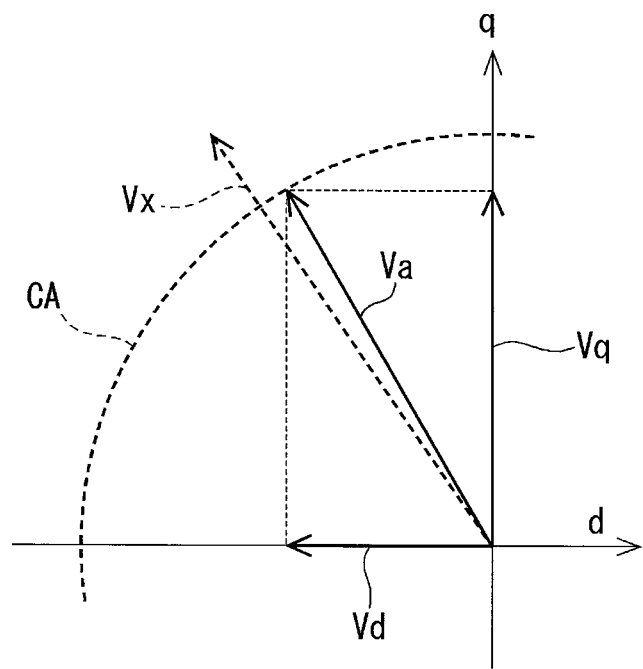
FIG. 23 is a graph showing a saturation guard of a q-axis voltage command value.

FIG. 19B is a flowchart for monitoring appropriateness of the q-axis voltage command value Vq*, which has already been subjected to a saturation guard. As shown in FIG. 23, the saturation guard is processing, which controls the q-axis voltage command value Vq* to remain inside a predetermined limit, which is indicated as a reference circle CA defined by the following equation (4.1).

$$Vd2+Vq2=Va2 \quad (4.1)$$

That is, if the q-axis voltage command value Vq* is outside the reference voltage circle CA, the q-axis voltage command value Vq* is corrected by the saturation guard to remain inside the reference voltage circle CA.

At S411 in FIG. 19B, pre-guarded and post-guarded q-axis voltage command values Vq*, which are before and after the saturation guard, are compared. The saturation guard is processing of correcting and limiting the q-axis voltage command value Vq* to remain inside the reference current circle CA. Therefore, if the calculation is normal, it never occurs that the q-axis voltage command value Vq* after saturation guard becomes greater than the q-axis voltage command value Vq* before the saturation guard (S411: YES). It never occurs either that the product of the q-axis voltage command value Vq* before the saturation guard and the q-axis voltage command value Vq* after the saturation guard becomes negative (S412: YES). If both S411 and S412 result in NO, an error flag of this monitoring processing is set to OFF (S413). If at least one of S411 and S412 results in YES, the error flag is set to ON (S414).

Figure 24:
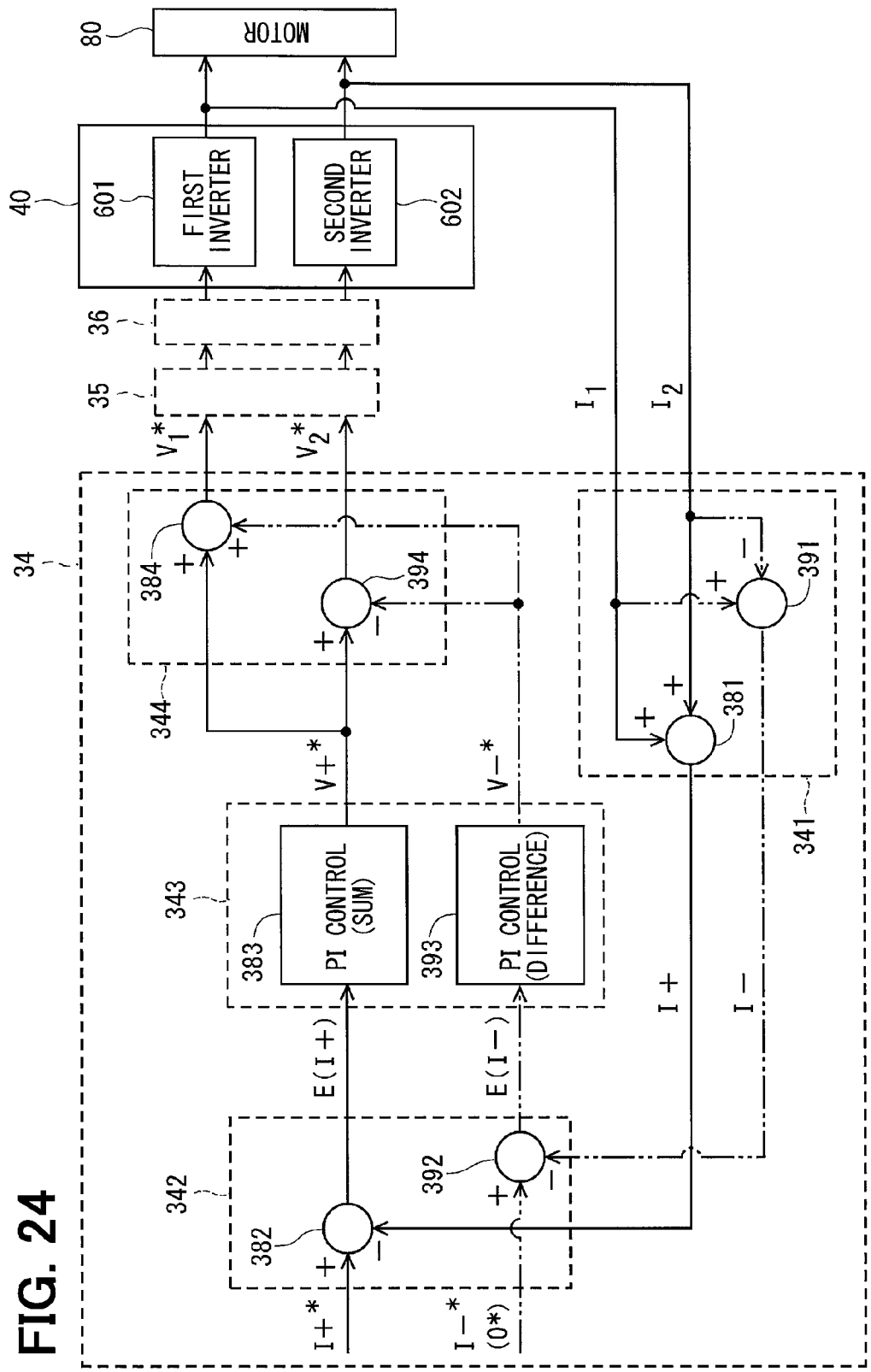
FIG. 24 is a block diagram of calculation of a current sum and a current difference by the current feedback calculation block.

FIG. 20 is a flowchart for monitoring the current sum/difference calculation of two systems. The current sum/difference calculation will be described in detail with reference to FIG. 24. In FIG. 24, the description will be simplified by not decomposing the current I and the voltage V into d-q axis vector. As shown in FIG. 24, the current feedback calculation block 34 controls the sum and the difference of currents of the two systems, which are defined as I+ and I− by the following equations (4.2) and (4.3), respectively.

$$I+=I1+I2 \quad (4.2)$$

$$I-=I1-I2 \quad (4.3)$$

In the control of current sum of the two systems, a current adder 381 of the current sum/difference calculation 341 adds the detection value I1 of the output current of the first inverter 601 and the detection value I2 of the output current of the second inverter 602 and outputs I+. A current sum deviation calculation 382 of the current deviation calculation 342 calculates a deviation, that is, error, E(I+) between the sum I+* of the current command values of the two systems and the sum I+ of the current detection values and outputs the deviation to a sum calculator 383 of the PI control calculation 343. The sum calculator 383 calculates a V+*, which is a sum of voltage command values as defined by the following equation (4.4), by proportional and integral control calculation so that the deviation E(I+) is converged to 0.

$$V+*=V1*+V2* \quad (4.4)$$

In the control of current difference of the two systems, a current subtractor 391 of the current sum/difference calculation 341 subtracts the detection value I2 of the output current of the second inverter 602 from the detection value I1 of the output current of the first inverter 601 and outputs I−. A current difference deviation calculation 392 of the current deviation calculation 342 calculates a deviation E(I−)

between the difference I-* of the current command values of the two systems and the difference I- of the current detection values and outputs the deviation to a difference calculator 393 of the PI control calculation 343. The difference calculator 393 calculates a V-*, which is a difference of voltage command values as defined by the following equation (4.5), by proportional and integral control calculation so that E(I-) is converged to 0.

$$V\text{-}^* = V1^* - V2^* \tag{4.5}$$

Since the electric characteristics of the first inverter 601 and the second inverter 602 are equal, the I-*, which is the difference between the current command values of the two systems, is basically 0(A).

In the individual voltage command calculation 344, a voltage calculator 384 of the first system calculates a voltage command value V1* of the first system by the following equation (4.6). A voltage calculator 394 of the second system calculates a voltage command value V2* of the second system by the following equation (4.7).

$$V1^* = (V+ + V\text{-}^*)/2 \tag{4.6}$$

$$V2^* = (V+ - V\text{-}^*)/2 \tag{4.7}$$

In the foregoing equations (4.2) to (4.7), I and V are replaced with Id, Iq and Vd, Vq on the d-q axis coordinate system, respectively.

FIG. 20 is a flowchart for monitoring whether the current sum/difference calculation is normal. In FIG. 20, the current I and the voltage V are assumed to be on the d-q axes. It is checked at S421 whether the q-axis current detection value Iq1 of the first system equals a value, which results from subtraction of the q-axis current detection value Iq2 of the second system from the Iq+ corresponding to the sum of the q-axis current detection values. It is checked at S422 whether the q-axis current detection value Iq1 of the first system equals a value, which results from addition of the q-axis current detection value Iq2 of the second system to the Iq- corresponding to the difference between the q-axis current detection values.

It is checked at S423 whether the Iq*+, which is the sum of the q-axis current command values, equals a value, which is the sum of a deviation E(Iq-) of the sum of Iq and the sum Iq+. It is checked at S424 whether the Iq*-, which is a difference between the q-axis current command values, that is, 0*, equals a value, which is a sum of the deviation E(Iq-) of the difference and the Iq-. If all the conditions of S421 to S424 are satisfied (YES), an error flag of this monitoring processing is set to OFF (S425). If at least one of S421 to S424 is NO, the error flag is set to ON (S426).

Figure 21:
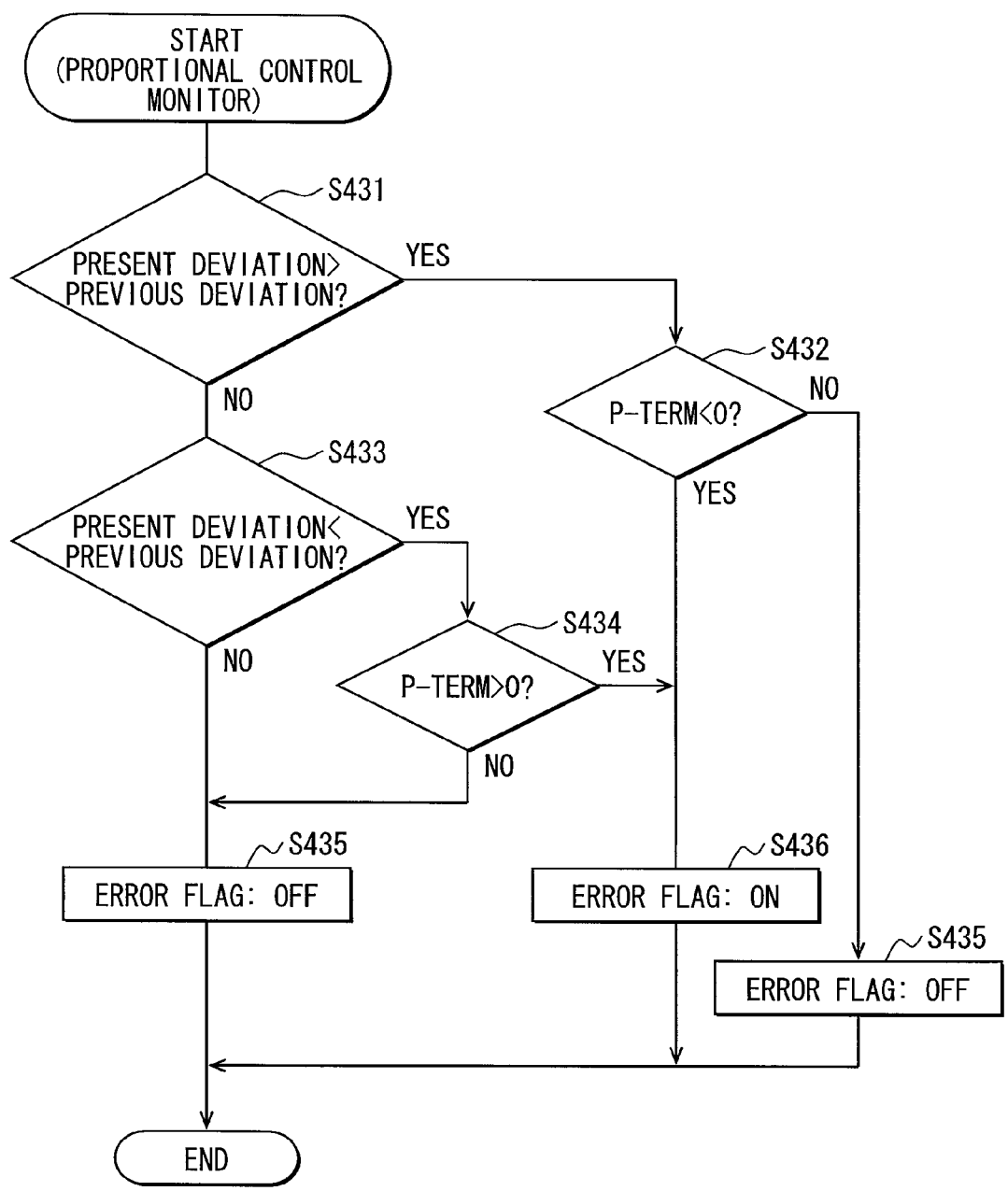
FIG. 21 is a flowchart of software monitoring processing of the current feedback calculation block.
Figure 22:
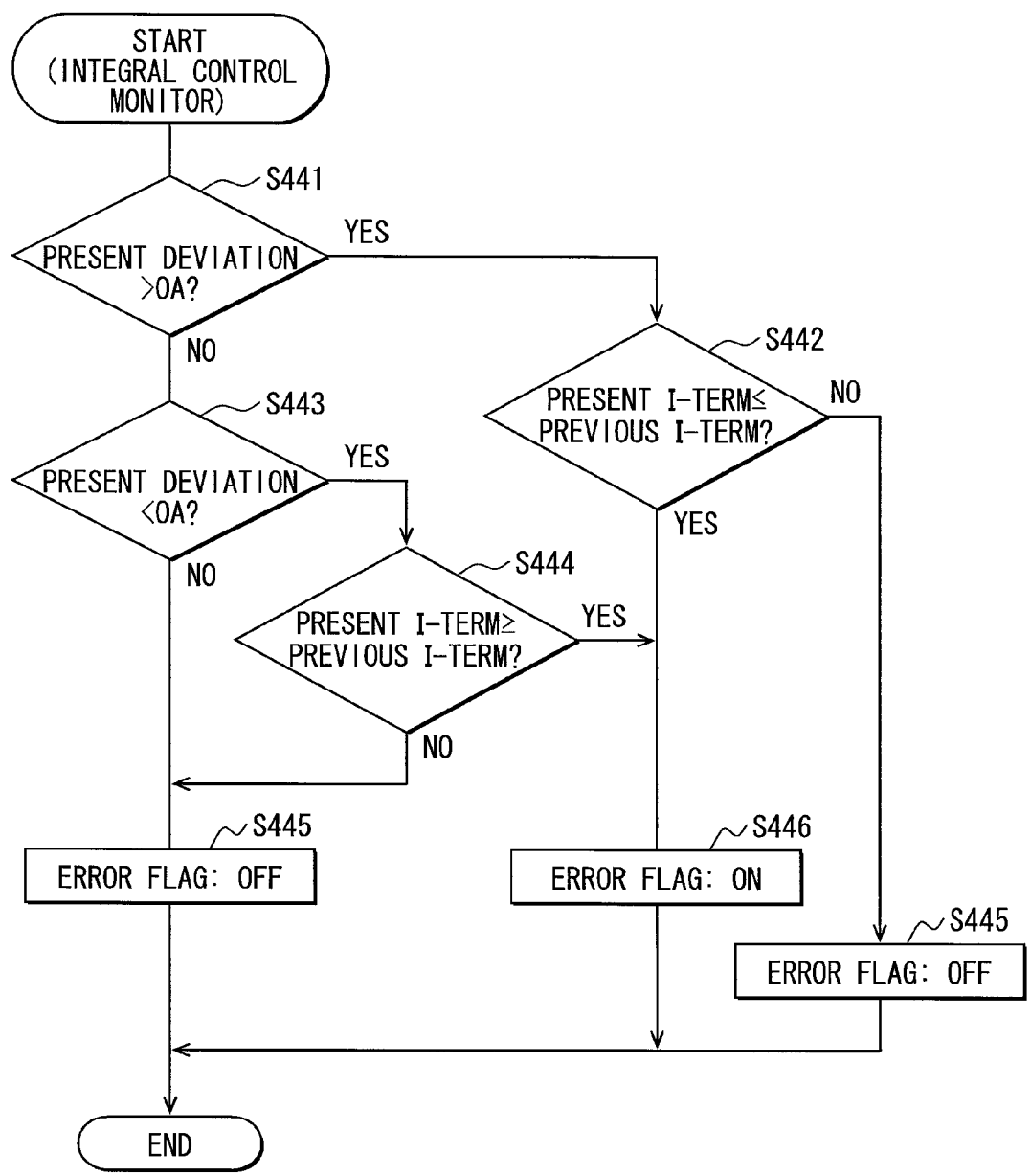
FIG. 22 is a flowchart of software monitoring processing of the current feedback calculation block.

FIG. 21 and FIG. 22 are flowcharts for monitoring the calculation of PI control calculation 343 of the current feedback. The monitoring processing of FIG. 21 is related to constants in the proportional control (P-control). The proportional control is for determining an operation amount, which is proportional to the deviation of the actual value from the target value. If this calculation is normal, it never arises that a P-term value becomes negative (S432: YES) if the present deviation is greater than the previous deviation (S431: YES) in the monitor period. If the present deviation is less than the previous deviation (S433: YES), it never arises that the P-term value becomes positive (S434: YES). If both S432 and S434 result in NO, an error flag of this monitoring is set to OFF (S435). If at least one of S432 and S434 is YES, the error flag is set to ON (S436).

The monitoring processing of FIG. 22 is related to constants in the integral control (I-control). The integral control is for determining an operation amount, which is proportional to an integration of previous deviations. If this calculation is normal, it never arises that the I-term value of the present time (present I-term) becomes less than the I-term value of the previous time (S442: YES) in case of an undershoot, in which the present deviation is greater than 0A (S441: YES), in the monitor period. In case of an overshoot (S433: YES), in which the present deviation is less than 0A, it never arises that the present I-term value becomes greater than the previous I-term value (S444: YES). If both S442 and S444 result in NO, an error flag of this monitoring processing is set to OFF (S445). If at least one of S442 and S444 is YES, the error flag is set to ON (S446).

[Two-Phase to Three-Phase Conversion Calculation Block 35]

Figure 25:
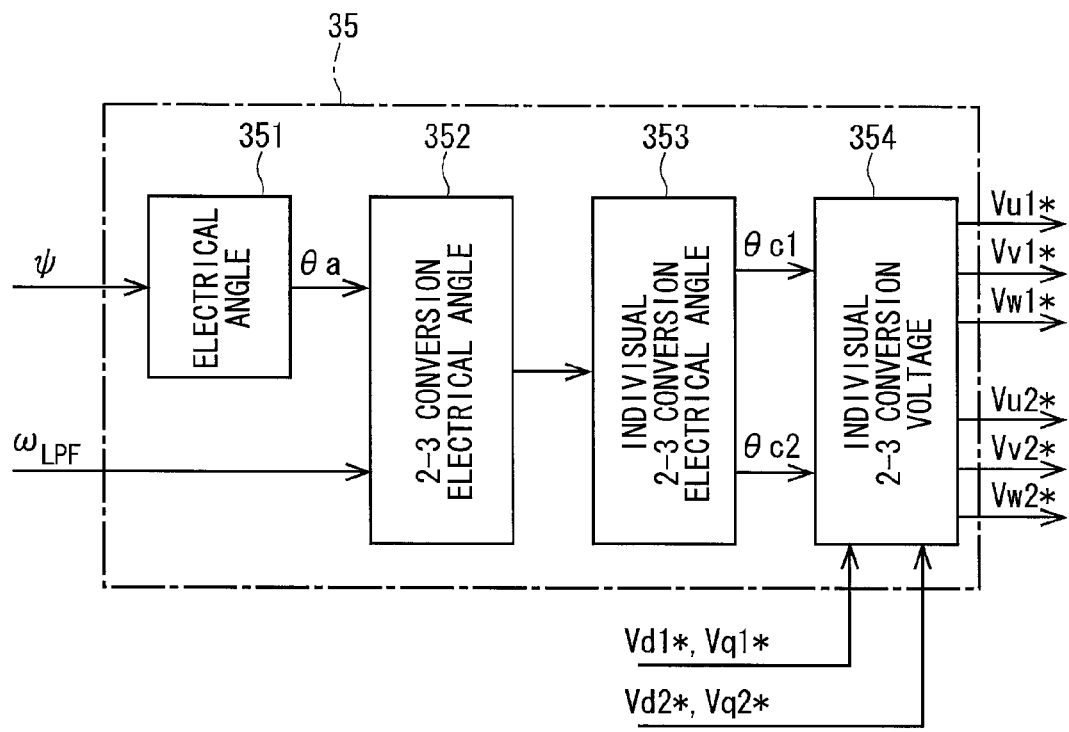
FIG. 25 is a control block diagram of a two-phase to three-phase conversion calculation block of the microcomputer.

Software monitoring processing of the two-phase to three-phase conversion calculation block 35 will be described with reference to FIG. 25 and FIG. 26. As shown in FIG. 25, the two-phase to three-phase conversion calculation block 35 executes calculations, which include a motor electrical angle calculation 351, a two-phase to three-phase conversion (2-3 phase conversion) electrical angle calculation 352, an individual two-phase to three-phase conversion (2-3 phase conversion) electrical angle calculation 353 and an individual two-phase to three-phase conversion (2-3 phase conversion) voltage calculation 354.

The motor electrical angle calculation 351 is similar to the motor electrical angle calculation 331 executed in the three-phase to two-phase conversion calculation block 33 described with reference to FIG. 15. The electrical angle calculation 352 for two-phase to three-phase conversion and the individual electrical angle calculation 353 for two-phase to three-phase conversion calculate electrical angles $\theta c1$ and $\theta c2$ for the two-phase to three-phase conversion based on the corrected motor electrical angle $\theta a$ and the motor rotation angular velocity $\omega LPF$, which is low-pass filtered. Here, the electrical angle $\theta c2$ of the second system is advanced 30° relative to the electrical angle $\theta c1$ of the first system. This difference of 30° in electrical angle is expressed as the following equation (5.1) by using ($\theta a \pm 15°$).

$$\theta c2 - \theta c1 = (\theta a + 15°) - (\theta a - 15) \tag{5.1}$$

Figure 26A:
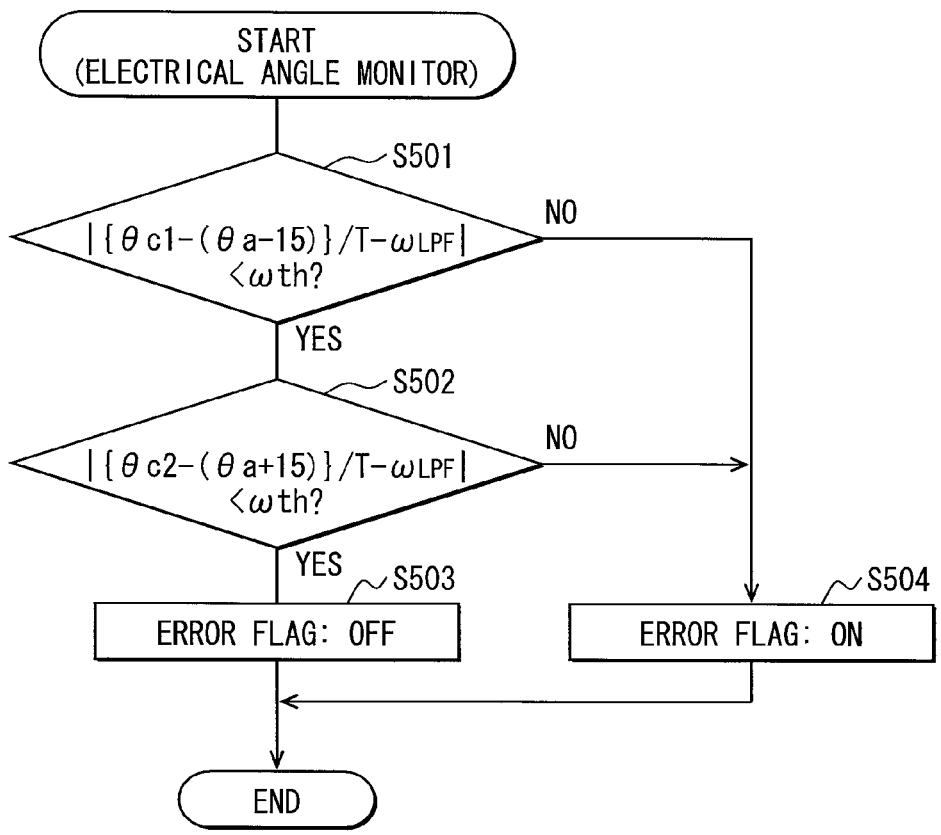
FIG. 26A and 26B are flowcharts of software monitoring processing executed by the two-phase to three-phase conversion operation part.

FIG. 26A is a flowchart for monitoring a stage of this calculation. If this calculation is normal, each of absolute values of the following two angular velocity difference should be less than a predetermined angular velocity threshold value $\omega th$. A first angular velocity difference is a difference between a variation of an angle difference between $\theta c1$ and ($\theta a - 15°$) in the first system in a predetermined time T and the motor rotation angular velocity $\omega LPF$. A second angular velocity difference is a difference between a variation of an angule difference between $\theta c2$ and ($\theta a + 15°$) in the second system in the predetermined time T and the motor rotation angular velocity $\omega LPF$. For this reason, the angular velocity difference in the first system and the angular velocity difference in the second system are compared with the threshold values $\omega th$, respectively, at S501 and S502. If both of the absolute values of the angular velocity differences are less than the threshold value $\omega th$, an error flag of this processing is set to OFF (S503). If the calculated absolute value is greater than the threshold value $\omega th$ in at least one of the systems, the error flag is set to ON (S504).

Figure 26B:
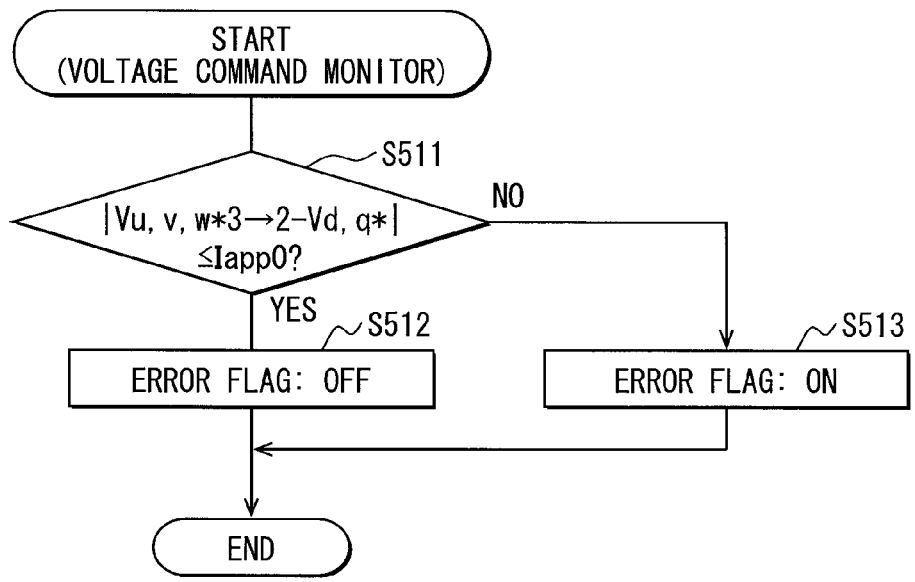

The three-phase to two-phase conversion calculation 354 of each system converts two-phase voltage command values Vd*, Vq* to three-phase voltage command values Vu*, Vv*, Vw* by using the electrical angles $\theta c1$, $\theta c2$. FIG. 26B is a flowchart for monitoring whether the two-phase to three-phase conversion calculation 354 is normal. At S511, a value (Vu, v, w*3-2), which is converted from three-phase to two-phase by d-q conversion of the three-phase voltage command values Vu*, Vv*, Vw*, is compared with a value (Vd,q*), which is the d-q axis voltage command value Vd*, Vq*, with respect to each system. If the absolute value of the voltage difference is less than the zero-approximation voltage difference Vapp0, an error flag or this monitor processing is set to OFF (S512). If the absolute value is greater than Vapp0, the error flag is set to ON (S513).

Matching of the calculated electrical angle θ and the mechanical angle ψ is monitored similarly as shown in FIG. 17 and described in the three-phase to two-phase conversion calculation block 33.

[PWM Command Calculation Block 36]

Figure 27:
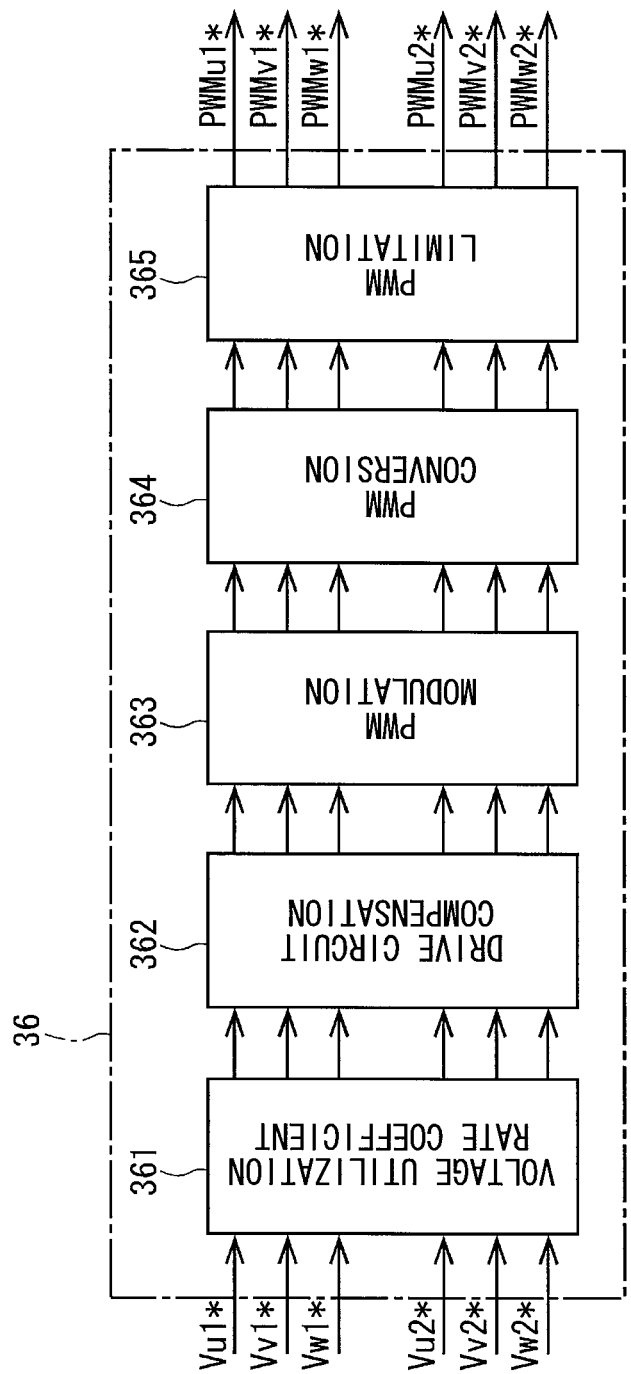
FIG. 27 is a control block diagram of a PWM command calculation block of the microcomputer.

Software monitoring processing of the PWM command calculation block 36 will be described with reference to FIG. 27 to FIG. 30. As shown in FIG. 27, the PWM command calculation block 36 executes calculations, which include a voltage utilization rate coefficient processing calculation 361, a drive circuit compensation calculation 362, a PWM modulation processing calculation 363, a PWM conversion calculation 364 and a PWM limitation calculation 365.

Figure 28:
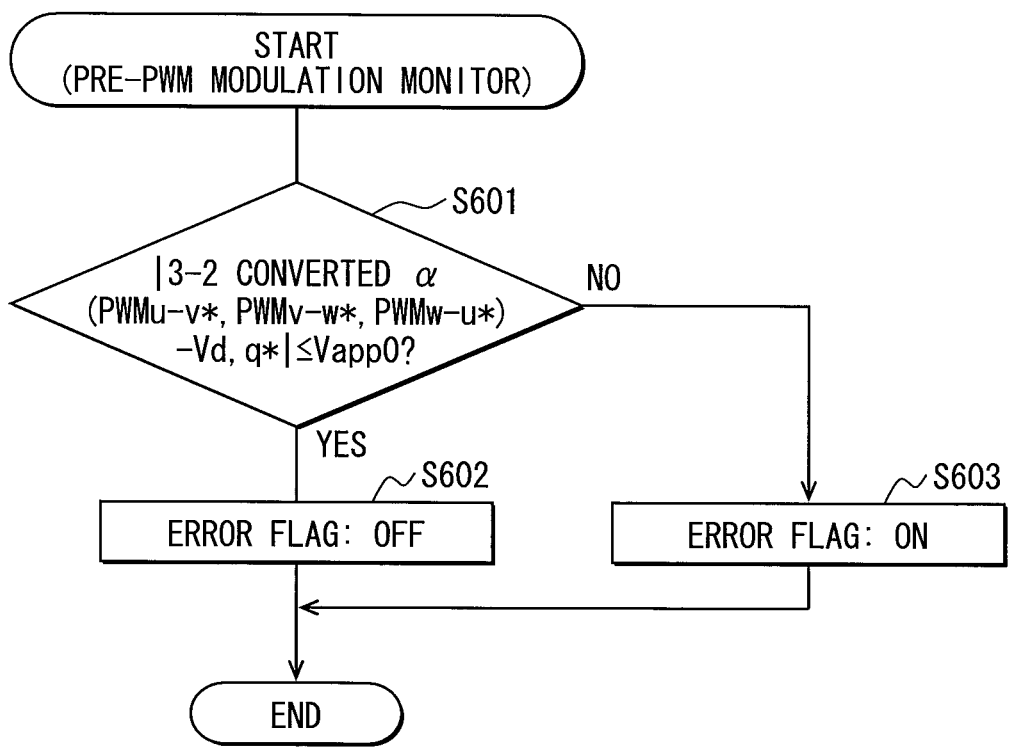
FIG. 28 is a flowchart of software monitoring processing executed by the PWM command calculation block.

FIG. 28 is a flowchart for monitoring whether the calculations up to the PWM conversion calculation 364 is normal. Symbols in the conditional equation in S601 are defined as follows.

PWMu-v*: U-phase PWM command–V-phase PWM command (%)

PWMv-w*: V-phase PWM command–W-phase PWM command (%)

PWMw-u*: W-phase PWM command–U-phase PWM command (%)

α: Coefficient (V/%) for converting the PWM command to voltage

That is, at S601, the voltage conversion values of the PWM command differences among the phases are converted from three-phase to two-phase and resulting values are compared with the d-q axis voltage command values Vd*, Vq*. If an absolute value of the voltage difference is less than the zero-approximation voltage value Vapp0, an error flag of this monitoring is set to OFF (S602). If the absolute value is greater than Vapp0, the error flag is set to ON (S603).

Figure 29:
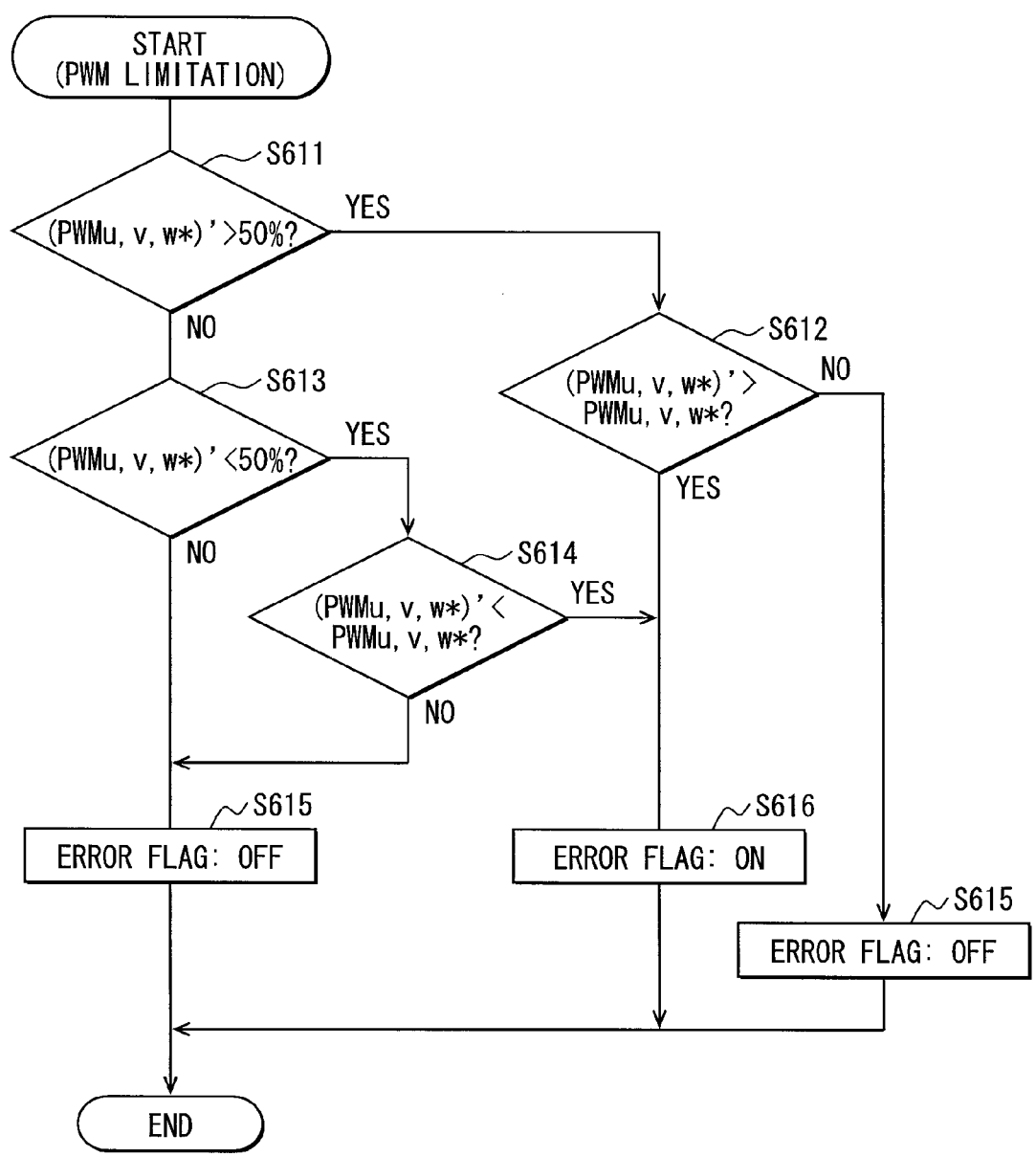
FIG. 29 is a flowchart of software monitoring processing executed by the PWM command calculation block.

FIG. 29 is a flowchart for monitoring whether the PWM limitation calculation is normal. The PWM limitation is performed to limit the PWM command of each phase is limited to remain in a range between a predetermined low limit value and a predetermined high limit value. Therefore, if the calculation is normal, it will never arise in a range of a PWM command greater than the intermediate value 50% (S611: YES) that the PWM command of each phase (PWMu, v, w*)' after limitation is greater than the PWM command of each phase (PWMu, v, w*) before limitation (S612: YES). In addition, it will never arise in a range of a PWM command less than the intermediate value 50% (S613: YES) that the PWM command of each phase (PWMu, v, w*)' after limitation is less than the PWM command of each phase PWMu, v, w* before limitation (S614: YES). If S612 or S614 results in NO, an error flag of this monitoring processing is set to OFF (S615). If at least one of S612 and S614 results in YES, the error flag is set to ON (S616).

Figure 30:
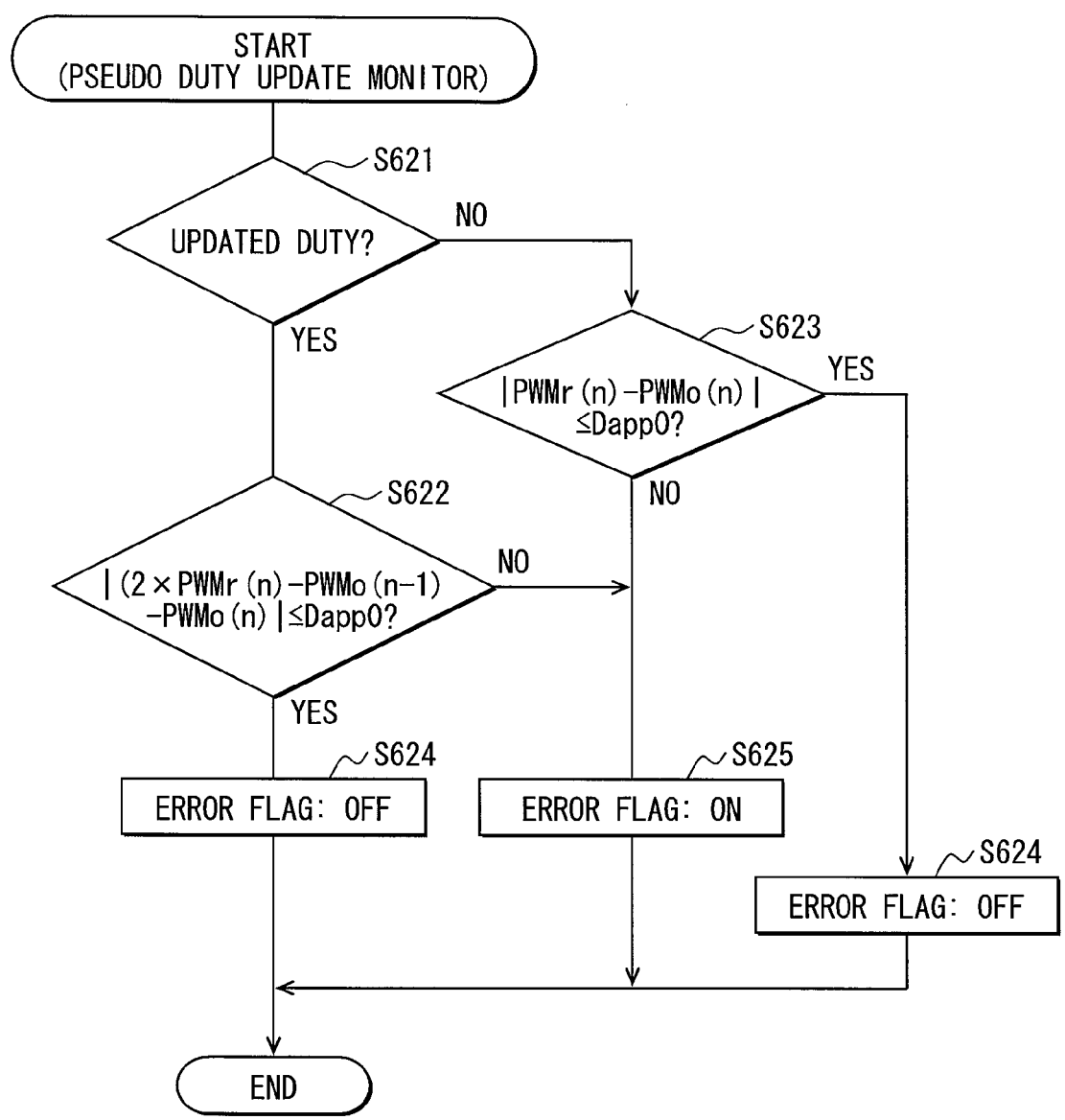
FIG. 30 is a flowchart of software monitoring processing executed by the PWM command calculation block.

FIG. 30 is a flowchart for monitoring whether update calculation in the pseudo duty update processing is normal. The pseudo duty update processing is processing for outputting pseudo duties plural times in one cycle period of control calculation of a PWM command so that the motor is controlled stably thereby to reduce noise, vibration, torque ripple and the like. If the control calculation period is 200 µs, for example, the pseudo duty is outputted at every update period of 100 µs, which corresponds to one-half of the control calculation period.

In executing the pseudo duty update processing, the pseudo PWM command is calculated by, for example, linear interpolation of two PWM commands, which are calculated immediately before and one cycle period before the immediately-before time. Here, the pseudo duty is calculated as expressed by the following equation (6.1).

$$PWMr(n)=\{PVVMo(n-1)+PWMo(n)\}/2 \quad (6.1)$$

In this equation, PWMo(n), PWMo(n-1) and PWMr(n) are defined as follows.

PWMo(n): PWM command in a n-th control calculation,

PWMo(n-1): PWM command (previous value) in a (n-1)th control calculation, and

PWMr(n): pseudo duty updated and outputted 100 µs after n-th control calculation.

Equation (6.1) is rewritten as equation (6.2).

$$2 \times PWMr(n)-PWMo(n-1)=PWMo(n) \quad (6.2)$$

If no pseudo duty update processing is executed, the output of 100 µs after the n-th control calculation becomes equal to the PWM command of the n-th control calculation as expressed by the following equation.

$$PWMr(n)=PWMo(n) \quad (6.3)$$

In the monitor processing shown in FIG. 30, when the pseudo duty update processing is executed (S621: YES), an error flag of this monitor processing is set to OFF (S624) if an absolute value of a difference between terms of both sides of the equation (6.2) is less than a zero-approximation duty Dapp0 (S622: YES). If it is greater than Dapp0, the error flag is set to ON (S625). When the pseudo duty update processing is not executed (S621: NO), the error flag is set to OFF (S624) if an absolute value of a difference between terms of both sides of the equation (6.3) is less than the zero-approximation duty Dapp0. If it is greater than Dapp0, the error flag is set to ON (S625).

As described above, the motor control apparatus 10 according to the present embodiment can detect the software abnormality of the microcomputer 30 internally without using a monitoring hardware separately, by the microcomputer 30, which executes the software monitoring processing in parallel with its control calculation. That is, since a communication line is not needed as opposed to a case of using a separate monitoring hardware, it is not needed to provide a sufficient margin for a monitor threshold value for avoiding erroneous detection. Further, the communication speed, which is limited by a communication line, is not limited. Thus the software abnormality of the microcomputer 30 can be detected at early time over a wide range of monitoring. According to the software monitoring processing, since an error is monitored based on the relation between the input and the output of each calculation block of the microcomputer 30, the amount of calculation in each calculation block can be reduced. In addition, it becomes easier to identify the location of abnormality.

The motor control apparatus 10 according to the present embodiment has two systems, each of which includes the motor 80 and the drive circuit 40. It is hence possible to monitor whether the calculation is normal by comparing the detection values or the calculation values of respective systems between the two systems. As a result, a detailed monitoring method can be selected from a variety of methods in the software monitoring processing. In addition, the electric power steering apparatus 1 incorporating the motor control apparatus 10 requires a particularly high level of safety. It is thus possible to further enhance reliability by executing the software monitoring processing described above in addition to failure detection by conventional hardware.

In the above-described embodiment, the mechanical construction of the motor and the software construction for the motor control are one example. The motor control apparatus is therefore not limited to the above-described embodiment but may be implemented differently as exemplified below.

(a) The software monitoring processing need not necessarily be executed with respect to each of calculation blocks of the microcomputer. The monitoring processing may be executed in a lump with respect to all control calculations of the microcomputer.

(b) The number of systems each including the motor and the drive circuit is not limited to two but may be one. In the case of motors in two systems, the phase difference between the systems is not limited to 30°.

(c) The number of magnetic pole pairs of the motor is not limited to five. The ratio between the electrical angle and the mechanical angle of the motor is variable in accordance with the number of magnetic pole pairs.

(d) The rotation angle sensor and the current angle sensor are not limited to the above-described types. When the shunt resistor is used as the current sensor, it may be provided at any one of the low FET side and the high FET side of the inverter. It may also be provided between the inverter and the motor.

(e) The motor control apparatus may be applied to a DC motor and a brushed motor without being limited to the three-phase brushless motor.

The motor control apparatus may be applied to any motor control apparatuses without being limited to the steering assist motor of the electric power steering apparatus.

What is claimed is:

1. A motor control apparatus for a motor having three phases, the
   motor control apparatus comprising:
   a drive circuit for driving the motor;
   an A/D converter for converting an analog signal of a sensor, which detects an operating condition of the motor, into a digital signal; and
   a microcomputer configured to calculate a control amount for driving the motor by executing a control software based on the digital signal inputted from the ND converter and output a calculated control amount to the drive circuit,
   wherein the microcomputer is further configured to execute a software monitor processing, which monitors whether calculation of the control amount is executed normally, in parallel to the calculation of the control amount,
   wherein the calculation of the control amount includes three-phase to two-phase conversion, which d-q converts three-phase current detection values to d-q axis current detection values by using an electric angle of the motor, and two-phase to three-phase conversion, which converts two-phase voltage command values to three-phase voltage command values, and
   wherein the microcomputer compares values, which result from two-phase to three-phase conversion of the d-q axis current detection values by reverse d-q conversion, with the three-phase current detection values to monitor whether the three-phase to two-phase conversion is normal, and
   wherein the microcomputer compares values, which result from three-phase to two-phase conversion of the three-phase voltage command values by d-q conversion, with the two-phase voltage command values, to monitor whether the two-phase to three-phase conversion is normal.

2. The motor control apparatus according to claim 1, wherein:
   the microcomputer executes a control software to perform a plurality of calculation functions, each of which calculates an output from an input thereof; and
   the microcomputer executes the software monitor processing with respect to each of the calculation functions.

3. The motor control apparatus according to claim 2, wherein:
   each of the calculation functions is provided to calculate the control amount for driving the motor.

4. The motor control apparatus according to claim 2, wherein:
   each of the calculation functions is provided to check whether an input thereto, which is an output of a preceding one of the calculation functions, is normal.

5. The motor control apparatus according to claim 1, wherein:
   the drive circuit includes two inverters forming two power supply systems for two coil sets of the motor, respectively; and
   the microcomputer executes the software monitor processing by comparing detection values detected in the two power supply systems or calculation values calculated based on the detection values, respectively, between the two power supply systems.

6. An electric power steering apparatus comprising:
   a steering assist motor for generating assist torque to assist steering operation of a driver;
   the motor drive apparatus according to claim 1; and
   a power transfer device for transferring the torque of the steering assist motor to a steering shaft.

7. The motor control apparatus according to claim 1, wherein:
   the microcomputer executes the software monitor processing at an interval longer than that of the calculation of the control amount.

8. The motor control apparatus according to claim 1, wherein:
   the control amount is an output of the microcomputer's pulse width modulation signal.

* * * * *